(12) United States Patent
Nagai

(10) Patent No.: US 7,673,117 B2
(45) Date of Patent: Mar. 2, 2010

(54) OPERATION APPARATUS

(75) Inventor: Tomoo Nagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 11/343,169

(22) Filed: Jan. 30, 2006

(65) Prior Publication Data

US 2006/0179166 A1 Aug. 10, 2006

(51) Int. Cl.
*G06F 15/00* (2006.01)

(52) U.S. Cl. .......................... 712/10; 712/220

(58) Field of Classification Search ................... 712/10, 712/221
See application file for complete search history.

(56) References Cited

U.S. PATENT DOCUMENTS

| | | | | |
|---|---|---|---|---|
| 4,056,848 A * | 11/1977 | Gilley | | 711/209 |
| 4,306,285 A * | 12/1981 | Moriya et al. | | 712/226 |
| 5,305,446 A * | 4/1994 | Leach et al. | | 712/34 |
| 5,363,322 A * | 11/1994 | Gergen et al. | | 708/620 |
| 5,390,304 A * | 2/1995 | Leach et al. | | 712/241 |
| 5,535,348 A * | 7/1996 | Leach et al. | | 712/241 |
| 5,583,985 A * | 12/1996 | Kohiyama et al. | | 345/534 |
| 5,872,987 A * | 2/1999 | Wade et al. | | 712/3 |
| 6,219,775 B1 * | 4/2001 | Wade et al. | | 712/11 |
| 6,263,420 B1 * | 7/2001 | Tan et al. | | 712/42 |
| 6,477,683 B1 * | 11/2002 | Killian et al. | | 716/1 |
| 6,760,888 B2 * | 7/2004 | Killian et al. | | 716/1 |
| 6,792,442 B1 * | 9/2004 | Kumura | | 708/523 |
| 7,020,854 B2 * | 3/2006 | Killian et al. | | 716/1 |
| 7,233,970 B2 * | 6/2007 | North et al. | | 708/491 |
| 7,505,295 B1 * | 3/2009 | Nataraj et al. | | 365/49.1 |
| 2002/0191450 A1 * | 12/2002 | North et al. | | 365/200 |
| 2003/0208723 A1 * | 11/2003 | Killian et al. | | 716/1 |
| 2004/0250231 A1 * | 12/2004 | Killian et al. | | 716/18 |
| 2006/0259878 A1 * | 11/2006 | Killian et al. | | 716/1 |

OTHER PUBLICATIONS

Cronquist, Darren C.; Franklin, Paul; Berg, Stefan G.; and Ebeling, Carl. "Specifying and Compiling Applications for RaPiD". Proceedings of the IEEE Symposium on FPGAs for Custom Computing Machines. IEEE © 1998. pp 1-10.*

* cited by examiner

*Primary Examiner*—Aimee J Li
(74) *Attorney, Agent, or Firm*—Sonnenschein Nath & Rosenthal LLP

(57) ABSTRACT

An operation apparatus able to continuously perform processing involving computations differing according to the input conditions, able to keep down useless processing when for example the processing may be interrupted in the middle if certain conditions are satisfied, and able to achieve an improvement of transfer efficiency of course and also able to keep down any increase of the system cost and able to reduce the processing time and power consumption, including an address generator for generating first source data and outputting it together with a control signal, an address generator for generating second source data and outputting it together with control signals, and an operation element for performing predetermined operation with respect to the first source data from the first generator and the second source data by the second generator while switching the type of operation in accordance with a control signal and having registers for temporarily holding operation results, wherein reading and writing of held data of registers are controlled according to control signals.

8 Claims, 25 Drawing Sheets

FIG. 2A PE SOURCE 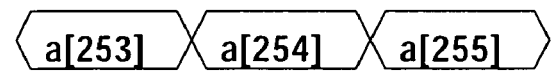
FIG. 2B PE CONTROL (CTLOP) 
FIG. 2C PE DESTINATION (S15) 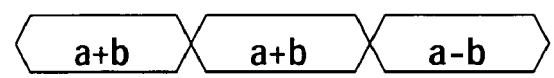

FIG. 4A PE0 SOURCE (DT22) 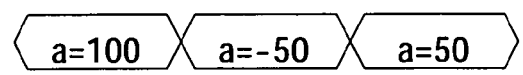
FIG. 4B PE CONTROL (CTLOP) 
FIG. 4C PE1 DESTINATION (S26) 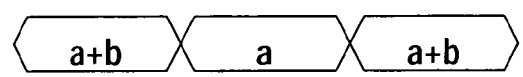

FIG. 6A PE0 SOURCE (DT22) 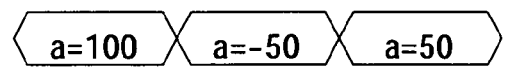
FIG. 6B PE CONTROL (CTLOP) 
FIG. 6C PE1 DESTINATION (S26) 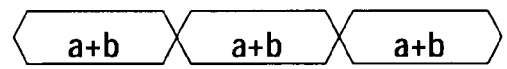
FIG. 6D MEM WE (CTLOP) 
FIG. 6E WRITE MEM ADDRESS 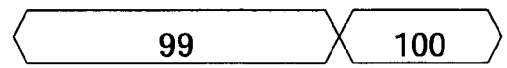

FIG. 8A READ MEM ADDRESS 
FIG. 8B PE DESTINATION 
FIG. 8C PE1 CONTROL 
FIG. 8D MEM WE 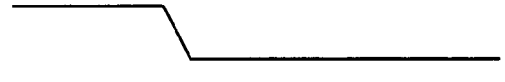
FIG. 8E WRITE MEM ADDRESS 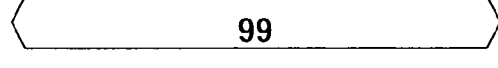

| b03 | b02 | b01 | b00 |
|---|---|---|---|
| b07 | b06 | b05 | b04 |
| b11 | b10 | b09 | b08 |
| b15 | b14 | b13 | b12 |

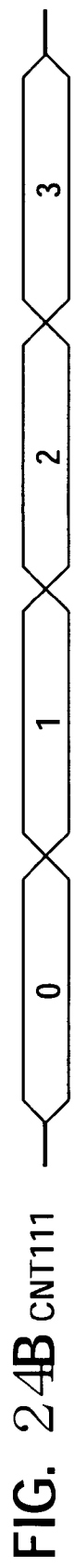
FIG. 24A CNT110
FIG. 24B CNT111
FIG. 24C ACNTV11
FIG. 24D ACNTV12
FIG. 24E SCV
FIG. 24F DIN
FIG. 24G ADR

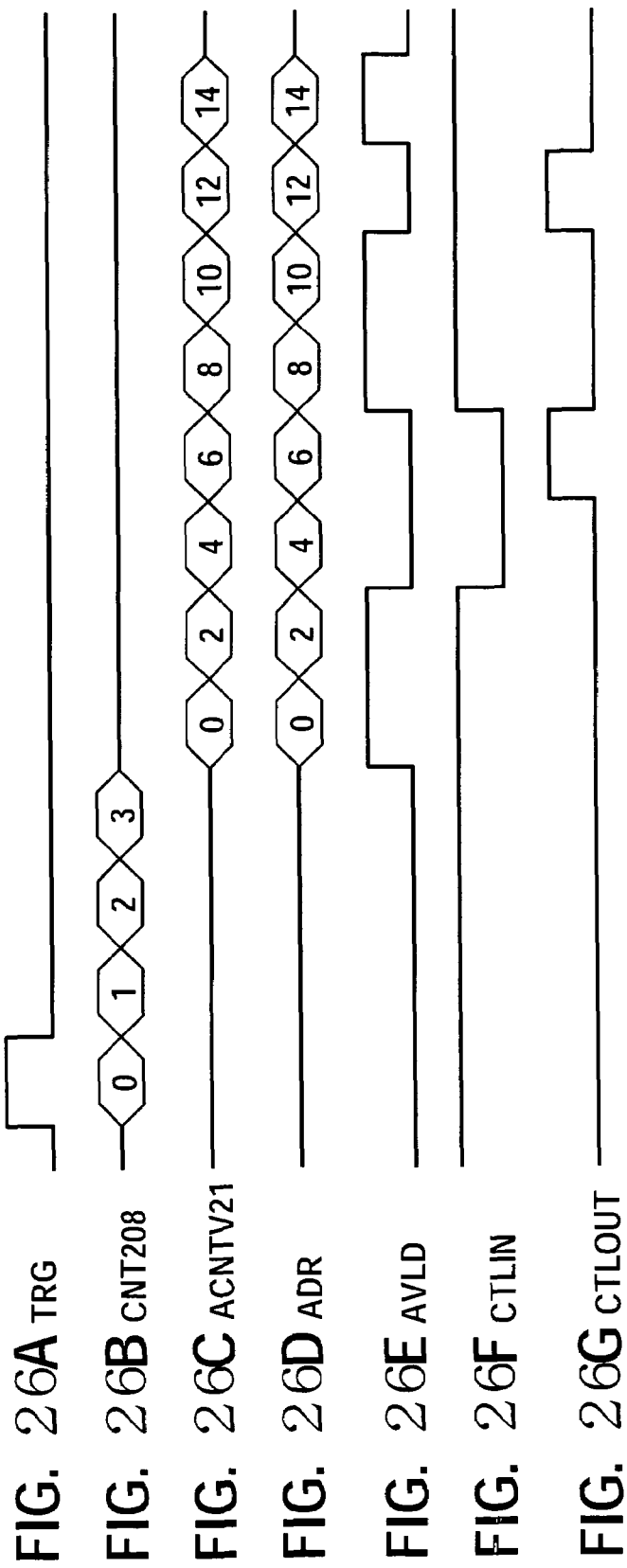

OPERATION APPARATUS

CROSS REFERENCES TO RELATED APPLICATIONS

The present invention contains subject matter related to Japanese Patent Application No. 2005-024910 filed in the Japan Patent Office on Feb. 1, 2005, the entire contents of which being incorporated herein by reference.

BACKGROUND OF THE INVENTION

1. Field of the Invention

The present invention relates to a so-called data flow type operation apparatus.

2. Description of the Related Art

A general data flow type operation element transferred continuous data from a memory and continuously performed a single type of operation determined in advance for the transferred data.

SUMMARY OF THE INVENTION

Such an operation element, however, may be impossible to continuously perform processing involving computations differing according to the input conditions.

Further, it has to perform a certain predetermined series of processing even when certain conditions are satisfied and the processing may be suspended, so performed useless processing.

Further, it had the disadvantage that when summing data having smaller word lengths than the data bus width, for example when handling 8-bit data in a 32-bit bus system, the transfer efficiency became poor.

Further, if trying to apply processing accompanied by a feedback such as IIR to hardware as it is, it was necessary to once write the operation result into the memory and then read out the result again from the memory, so there was the defect that a dual port memory became indispensable and the system cost became higher. Further, in a system with a large latency of memory→operation→memory due to internal pipelining, it was necessary to wait until all of the data was prepared before starting the operation, so the operation apparatus was poor in efficiency.

It is therefore desirable to provide an operation apparatus able to continuously perform processing involving computations differing according to the input conditions, able to keep down useless processing when for example the processing may be interrupted in the middle if certain conditions are satisfied, and able to achieve an improvement of transfer efficiency of course and also able to keep down any increase of the system cost and able to reduce the processing time and power consumption.

According to a first aspect of an embodiment of the present invention, there is provided an operation apparatus comprising a first generator for generating first source data; a second generator for generating second source data; and an operation element for performing predetermined operation and having registers for temporarily holding operation results, the predetermined operation being performed in association with the first source data and the second source data while by switching types of operation in response to a control signal, wherein, at least one of the first generator and the second generator adds the control signal to the generated source data and outputs the result to the operation element, and the reading and writing of the data held by the registers are controlled according to the control signal.

Preferably, the apparatus is provided with a memory for storing the first source data and the second source data, the first generator generates an address for reading the first source data and outputs the read first source data and the control signal to the operation element based on the generated address, and the second generator generates an address for reading the second source data and outputs the read second source data and the control signal to the operation element based on the generated address.

Preferably, the apparatus is further provided with a third generator for generating an address upon receiving the operation result of the operation element, and for writing the operation result into the memory.

Preferably, the operation element treats a plurality of data as a single group for accumulation when performing accumulation with data having a smaller word length than the bus width.

According to a second aspect of an embodiment of the present invention, there is provided an operation apparatus comprising a first generator for generating first source data; a second generator for generating second source data, adding a first control signal to the second source data, and for outputting the result; a third generator for generating third source data; a first operation element for performing predetermined operation to generate fourth source data in response to the first control signal, the predetermined operation being performed in association with the first source data and the second source data; and a second operation element for performing predetermined operation and having registers for temporarily holding operation results, the predetermined operation being performed in association with the third source data and the fourth source data while by switching types of operation in response to a second control signal, wherein, at least one of the third generator and the first operation element adds the second control signal to the generated source data and outputs the result to the second operation element, and the reading and writing of the data held in the registers are controlled according to the second control signal.

Preferably, the apparatus is further provided with a memory for storing the first source data, the second source data, and the third source data; the first generator generates an address for reading the first source data and outputs the read first source data to the first operation element based on the generated address; the second generator generates an address for reading the second source data and outputs the read second source data and the first control signal to the first operation element based on the generated address; and the third generator generates an address for reading the third source data and outputs the read third source data to the second operation element based on the generated address.

Preferably, the apparatus is further provided with a fourth generator for generating an address upon receiving the operation result of the second operation element, and writing the operation result into the memory.

Preferably, at least one of the first and second operation elements treats a plurality of data as a single group for accumulation when performing accumulation with data having a smaller word length than the bus width.

BRIEF DESCRIPTION OF THE DRAWINGS

These and other intents and features of the present invention will become clearer from the following description of the preferred embodiments given with reference to the attached drawings, wherein:

FIG. 2A to FIG. 2C are diagrams showing a state of execution of operation of an operation element of FIG. 1;

FIG. 4A to FIG. 4C are diagrams showing the states of execution of operation of operation elements of FIG. 3;

FIG. 6A to FIG. 6E are diagrams showing the states of execution of operation and the states of control of write operations into a memory of the operation elements of FIG. 5;

FIG. 8A to FIG. 8E are diagrams showing the states of execution of operation and states of control of write operations and control of read end operations to/from a memory of the operation elements of FIG. 7;

FIG. 24A to FIG. 24G are timing charts for explaining an address generation operation of the address generator of FIG. 23;

FIG. 26A to FIG. 26G are timing charts for explaining the address generation operation of the address generator of FIG. 25.

DESCRIPTION OF THE PREFERRED EMBODIMENTS

Below, embodiments of the present invention will be explained with reference to the drawings.

First Embodiment

Figure 1:
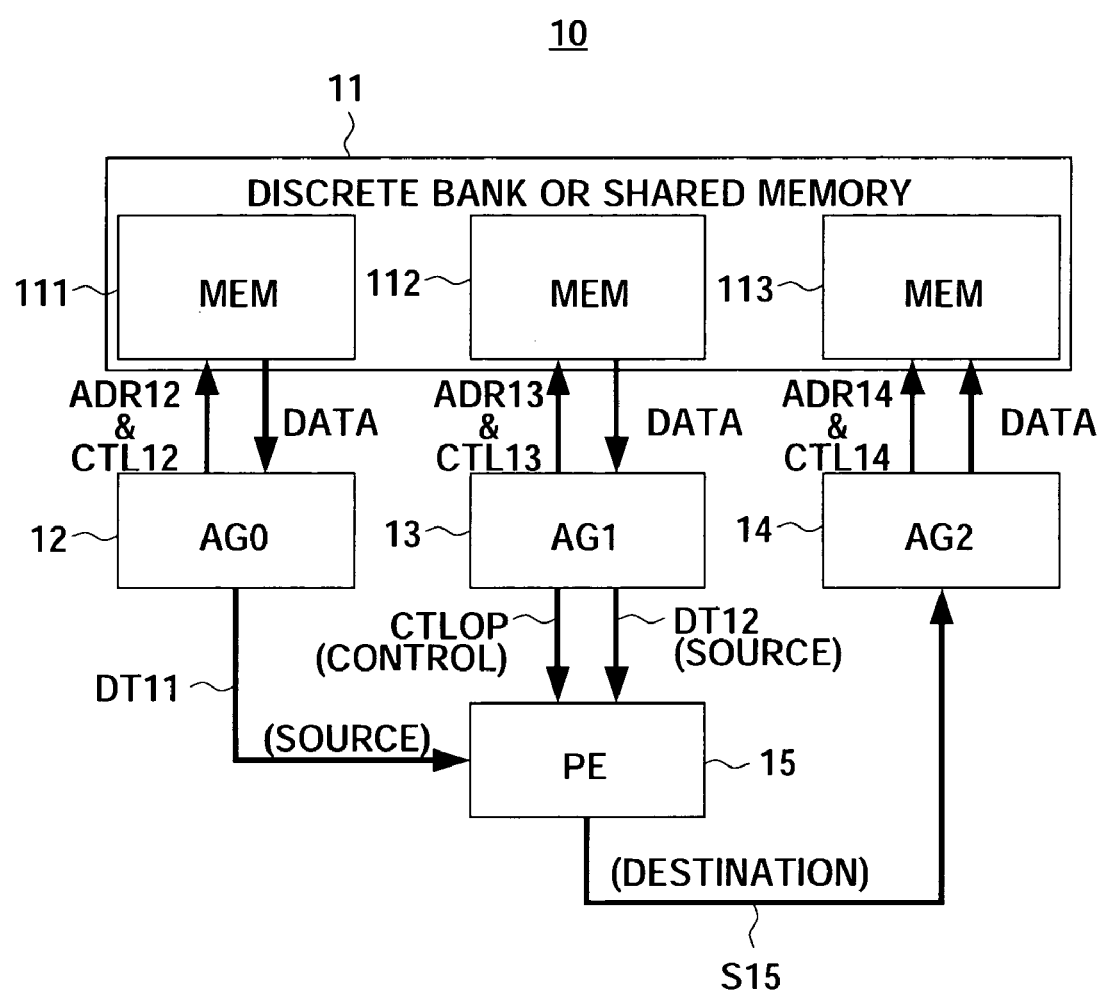
FIG. 1 is a view of the configuration of a data flow type operation apparatus according to a first embodiment of the present invention.

FIG. 1 is a view of the configuration of a data flow type operation apparatus according to a first embodiment of the present invention.

An operation apparatus 10 has a memory 11 provided with a plurality of (three in FIG. 1) banks 111 to 113, first to third address generators 12 (AG0), 13 (AG1), and 14 (AG2) provided corresponding to the banks 111 to 113, and an operation (processing) element (PE) 15.

The address generator 12 gives an address ADR12 and a control signal CTL12 to the bank 111, reads out the first data for operation by the operation element 15, and outputs this as first source data DT11 to the operation element 15.

The address generator 13 gives an address ADR13 and a control signal CTL13 to the bank 112, reads out the second data for operation by the operation element 15, and outputs this as second source data DT12 to the operation element 15 together with an operation control signal CTLOP.

The address generator 14 gives an address ADR14 and a control signal CTL14 to the bank 113 and stores the operation result of the operation element 15 in the bank 113.

The operation element 15 performs for example the conditional operation shown below with respect to the first source data DT11 from the address generator 12 and the second source data DT12 from the address generator 13 in accordance with the control signal CTLOP and outputs the operation result S15 (Destination) to the address generator 14.

The method of control of the operation element 15 will be explained next by taking as an example the conditional operation. The following example is an example of a program in the C language where that the index of the array becomes a branch condition.

Example of Program 1

```
for(i=0; i<256; i++){
    if(i>254)out[i]=a[i]-b[i];
    else out[i]=a[i]+b[i];
}
```

FIG. 2A to FIG. 2C are diagrams showing a state of execution of operation of the operation element 15. This shows that the operation switches from addition to subtraction only when a certain specific index condition is satisfied. The operation element itself does not know the index of array, that is, the address of the memory, therefore the control for switching the operation is performed by the side issuing the address, that is, the address generator 13, generating the control signal CTLOP.

In this example, there are two types of operations performed, therefore a signal line of 1 bit width is sufficient as the control line. A series of flow is realized where the control signal CTLOP is transferred to the operation element 15 together with the data read out from the memory by the address generator 13 as in FIG. 1, the operation is carried out by this operation element, and the result is written into the bank 113 of the memory 11 again.

Second Embodiment

Figure 3:
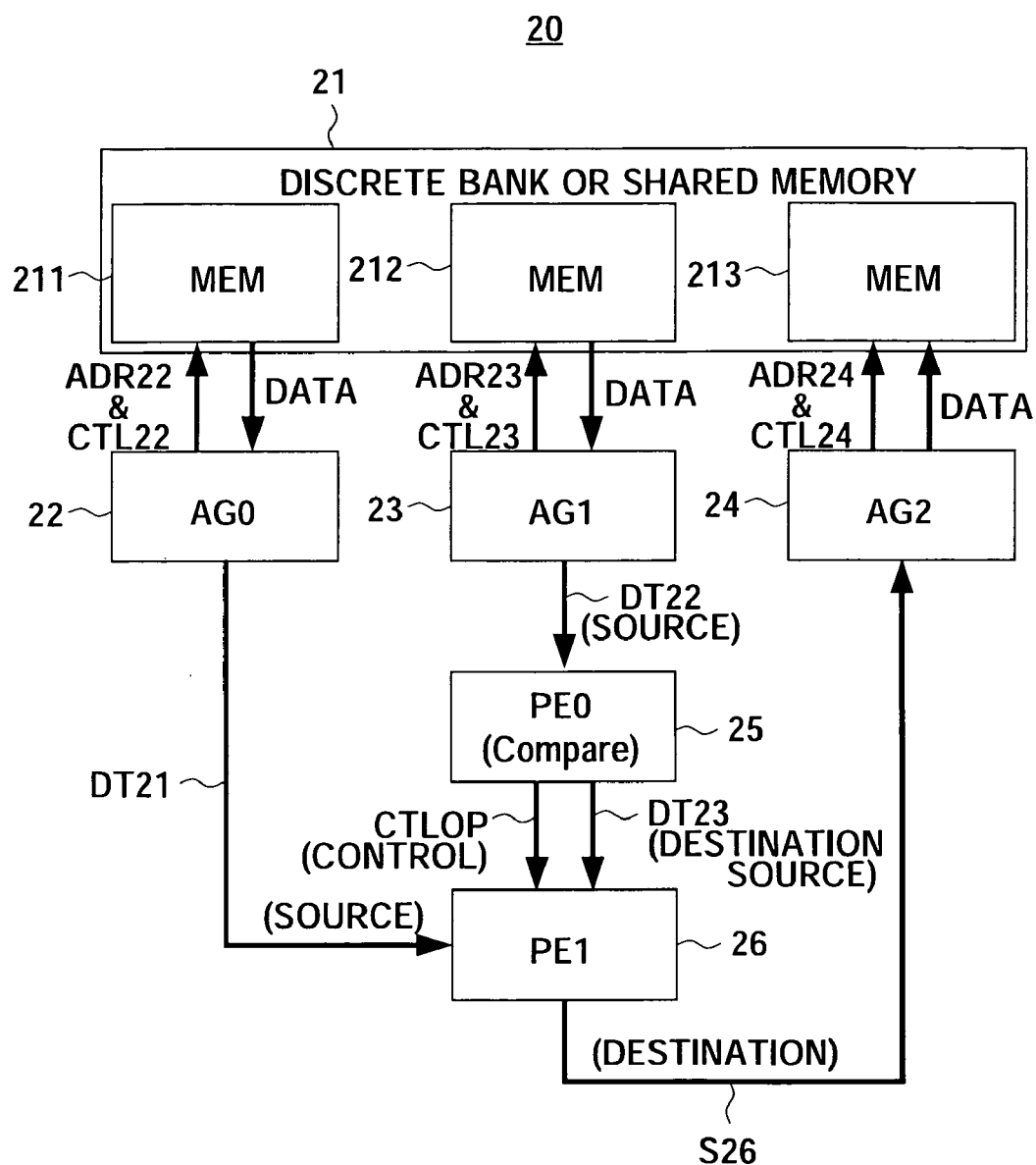
FIG. 3 is a view of the configuration of a data flow type operation apparatus according to a second embodiment of the present invention.

FIG. 3 is a view of the configuration of a data flow type operation apparatus according to a second embodiment of the present invention.

An operation apparatus 20 has a memory 21 provided with a plurality of (three in FIG. 3) banks 211 to 213, first to third address generators 22 (AG0), 23 (AG1), and 24 (AG2) provided corresponding to the banks 211 to 213, a first operation element (PE0) 25, and a second operation element (PE1) 26.

The address generator 22 gives an address ADR22 and a control signal CTL22 to the bank 211, reads out the first data for operation by the operation element 26, and outputs this as first source data DT21 to the operation element 26.

The address generator 23 gives an address ADR23 and a control signal CTL23 to the bank 212, reads out the second data for operation by the operation element 25, and outputs this as second source data DT22 to the operation element 25.

The address generator 24 gives an address ADR24 and a control signal CTL24 to the bank 213 and stores the operation result of the operation element 26 in the bank 213.

The operation element 25 performs a comparison operation based on the second source data DT22 from the address generator 23 and outputs the result as third source data DT23 to the operation element 26 together with the operation control signal CTLOP.

The operation element 26 performs for example the conditional operation shown below with respect to the first source data DT21 from the address generator 22 and the second source data DT22 from the address generator 23 in accordance with the control signal CTLOP and outputs the operation result S26 (Destination) to the address generator 24.

The method of control of the operation elements 25 and 26 will be explained next taking as an example a conditional operation. The following example is an example of a program in the C language wherein the index of array becomes a branch condition. Here, an example of a program where the value of the data becomes a branch condition will be shown below as another example.

Example of Program 2

```
for(i=0; i<256; i++){
    if(a[i]>0)out[i]=a[i]+b[i];
    else out[i]=a[i];
}
```

FIG. 4A to FIG. 4C are diagrams showing the states of execution of operation by the operation elements 25 and 26. In this example, the type of operation switches according to the value of the array input to the operation element. By cascade connecting the two operation elements as in FIG. 3 and performing the comparison operation at the earlier operation element 25, the control signal CTLOP for switching the operation of the later operation element 26 is generated. At this time, the operation result of the earlier operation element 25 is output of the same value as the input value. This is for establishing synchronization of the data and the control signal even when the inside of the operation element 25 is formed into a pipeline. Note that both of the two examples shown above are examples switching two types of operations, but in principle, switching of three or more types is also possible. In this case, 2 bits or more of control signals become necessary.

Third Embodiment

Figure 5:
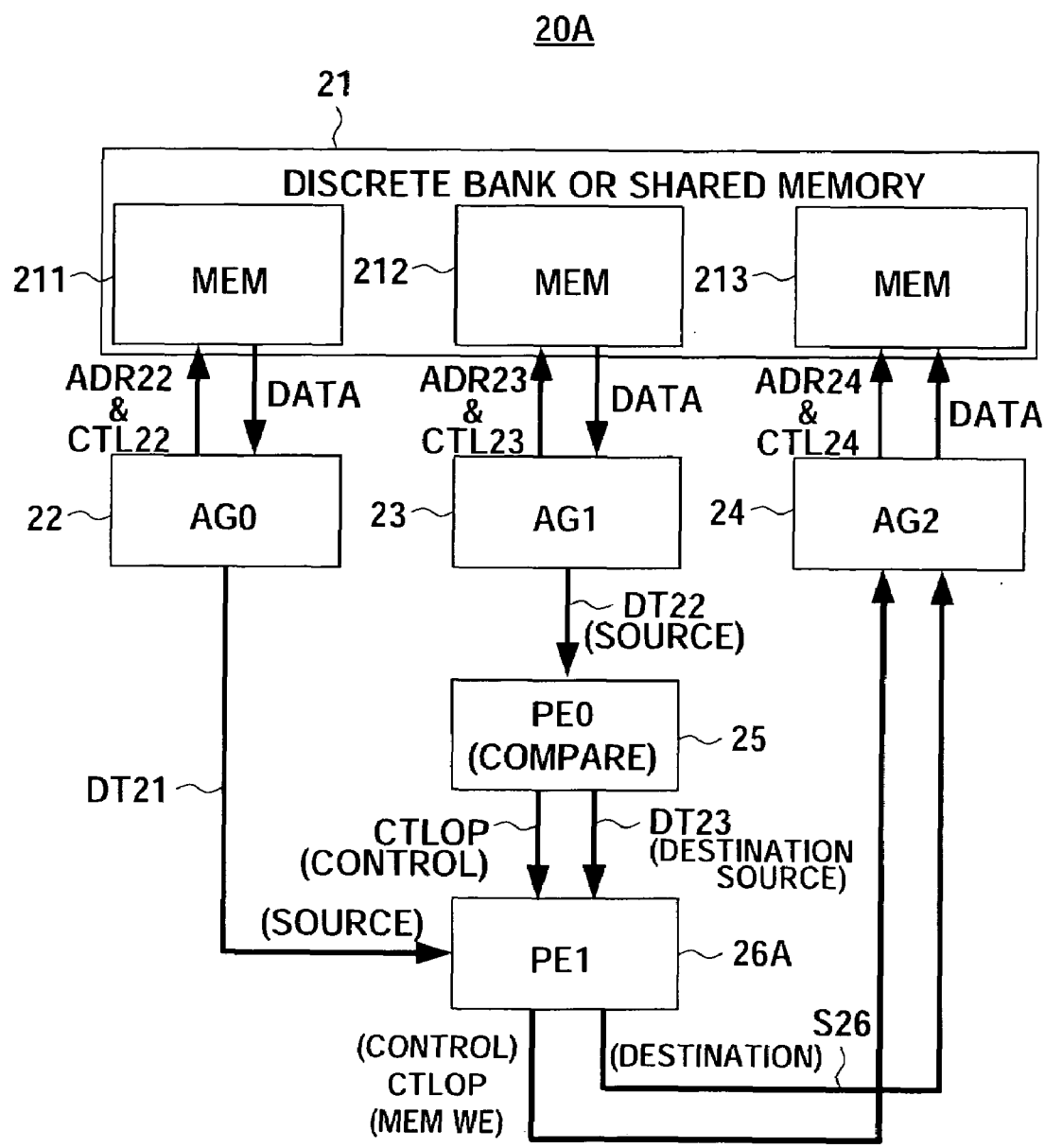
FIG. 5 is a view of the configuration of a data flow type operation apparatus according to a third embodiment of the present invention.

FIG. 5 is a view of the configuration of a data flow type operation apparatus according to a third embodiment of the present invention.

The difference of an operation apparatus 20A of the third embodiment from the operation apparatus 20 of the second embodiment resides in that the control signal CTLOP generated by the comparison operation in the operation element 25 is used as a control signal MEMWE of the address generator.

An example of a program using the control signal generated by the comparison operation for the control of the address generator will be shown below.

Example of Program 3

```
j=0;
for(i=0; i<256; i++){
    if(a[i]>0)out[j++]=a[i]+b[i];
}
```

FIG. 6A to FIG. 6E are diagrams showing the states of execution of operation and the states of control of write operations into the memory of the operation elements 25 and 26.

In this example, the operation of incrementing the index of array and writing the operation result into the memory is carried out only in the case when the value of the data which becomes the input of the operation satisfies a certain condition. FIG. 5 is an example of the configuration for realizing this example. Two operation elements 25 and 26 are cascade connected in the same way as FIG. 3, but the later operation element 26A typically performs a fixed operation. The control signal CTLOP generated by the comparison operation of the earlier operation element 25 passes through the later stage as it is and is transferred to the address generator 24 for the memory write operation together with the data. Even when the insides of the operation elements are formed into pipelines, the control signal typically passes through the same route as that for the data, so the data and the control signal are typically synchronized. The address generator 24 for the memory write operation controls the address and write operation (WE) with respect to the memory by using this control signal.

Fourth Embodiment

Figure 7:
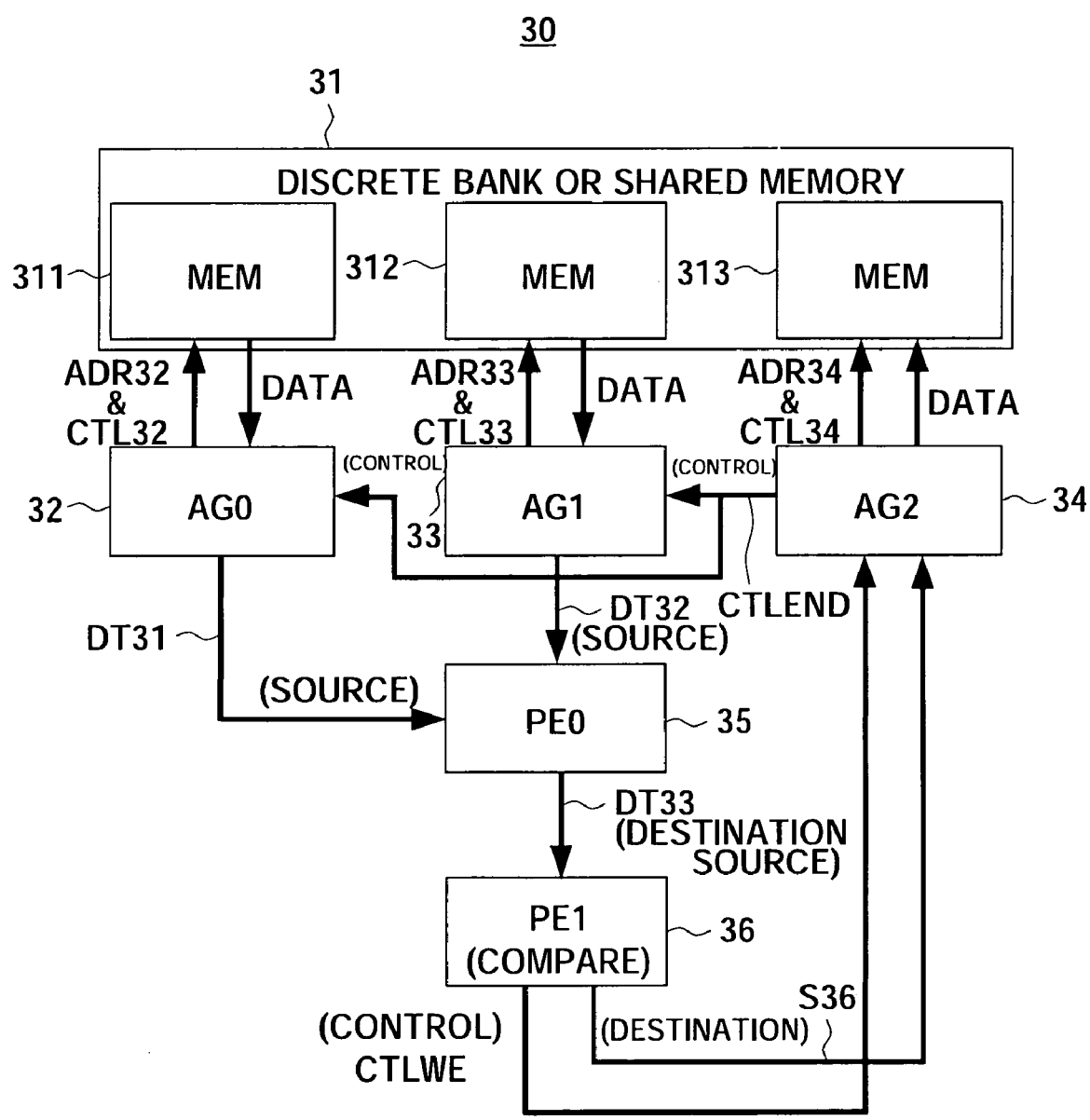
FIG. 7 is a view of the configuration of a data flow type operation apparatus according to a fourth embodiment of the present invention.

FIG. 7 is a view of the configuration of a data flow type operation apparatus according to a fourth embodiment of the present invention.

An operation apparatus 30 has a memory 31 provided with a plurality of (three in FIG. 7) banks 311 to 313, first to third address generators 32 (AG0), 33 (AG1), and 34 (AG2) provided corresponding to the banks 311 to 313, a first operation element (PE0) 35, and a second operation element (PE1) 36.

The address generator 32 gives an address ADR32 and a control signal CTL32 to the bank 311, reads out the first data for operation by the operation element 35, and outputs this as first source data DT31 to the operation element 35. Further, the address generator 32 receives a control signal CTLEND from the address generator 34 and ends the read operation.

The address generator 33 gives an address ADR33 and a control signal CTL33 to the bank 312, reads out the second data for operation by the operation element 35, and outputs this as second source data DT32 to the operation element 35.

Further, the address generator 33 receives the control signal CTLEND from the address generator 34 and ends the read operation.

The address generator 34 gives an address ADR34 and a control signal CTL34 to the bank 313 and stores the operation result of the operation element 36 in the bank 313 based on a control signal CTLWE from the operation element 36. Further, the address generator 34 generates the control signal CTLEND for ending one series of processings based on the control signal CTLWE from the operation element 36 and outputs this to the address generators 32 and 33.

The operation element 35 performs for example the conditional operation shown below with respect to the first source data DT31 from the address generator 32 and the second source data DT32 from the address generator 33 and outputs the result as third source data DT33 to the operation element 36.

The operation element 36 performs a comparison operation based on the third source data DT33 from the operation element 35 and outputs the operation result S36 (Destination) to the address generator 34 together with the control signal CTLWE of the memory write operation.

Below, an example of the program ending the loop processing in the middle according to the operation result will be shown.

---
Example of Program 4
---
for(i=0; i<256; i++){
    if((a[i]-b[i])==0)break;
    out[i]=a[i]-b[i];
}
---

FIG. 8A to FIG. 8E are diagrams showing the states of execution of operation and states of control of write operations and control of read end operations to/from the memory of the operation elements 35 and 36 in FIG. 7.

This shows that the operation result of the operation element 35 is compared at the later operation element 36 and that the control signal CTLWE generated by this is transferred to the address generator 34 for the memory write operation together with the data. The address generator 34 for the memory write operation controls the address and write operation (WE) with respect to the bank 313 of the memory 31 by this control signal CTLWE. At this time, by generating a control signal CTLEND that ends the operation for the address generators 32 and 33 for the memory read operation from the address generator 34 for the memory write operation so as to end the read operations of the banks 311 and 312 of the memory 31, one series of processing operations can be completely ended.

Fifth Embodiment

Figure 9:
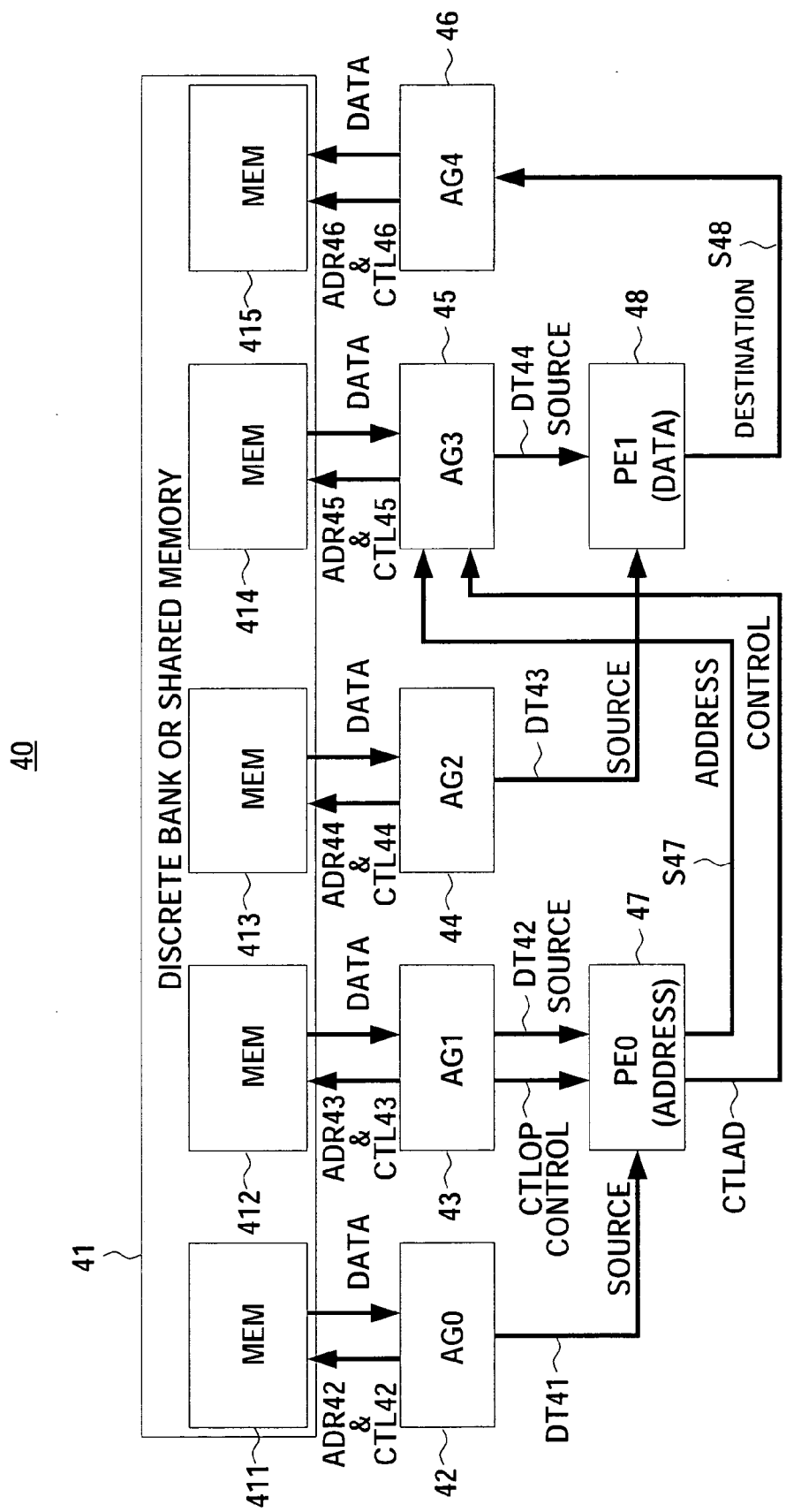
FIG. 9 is a view of the configuration of a data flow type operation apparatus according to a fifth embodiment of the present invention.

FIG. 9 is a view of the configuration of a data flow type operation apparatus according to a fifth embodiment of the present invention.

An operation apparatus 40 has a memory 41 provided with a plurality of (five in FIG. 9) banks 411 to 415, first to fifth address generators 42 (AG0), 43 (AG1), 44 (AG2), 45 (AG3), and 46 (AG4) provided corresponding to the banks 411 to 415, a first operation element (PE0) 47, and a second operation element 48 (PE1).

The address generator 42 gives an address ADR42 and a control signal CTL42 to the bank 411, reads out the first data for operation by the operation element 47, and outputs this as first source data DT11 to the operation element 47.

The address generator 43 gives an address ADR43 and a control signal CTL43 to the bank 412, reads out the second data for operation by the operation element 47, and outputs the same as a second source data DT42 to the operation element 47 together with the operation control signal CTLOP.

The address generator 44 gives an address ADR44 and a control signal CTL44 to the bank 413, reads out the third data for operation by the operation element 48, and outputs this as third source data DT43 to the operation element 48.

The address generator 45 gives an address ADR45 and a control signal CTL45 to the bank 414 based on a control signal CTLAD and address data S47 from the operation element 47, reads out the fourth data, and outputs this as fourth source data DT44 to the operation element 48.

The address generator 46 gives an address ADR46 and a control signal CTL46 to the bank 415 and stores the operation result S48 of the operation element 48 in the bank 415.

The operation element 47 generates for example the address data S47 by predetermined operation with respect to the first source data DT41 from the address generator 42 and the second source data DT42 from the address generator 43 in accordance with the first control signal CTLOP and outputs the result together with the second control signal CTLAD to the address generator 45.

The operation element 48 performs predetermined operation with respect to the third source data DT43 from the address generator 44 and the fourth source data DT44 from the address generator 45 and outputs the operation result S48 (Destination) to the address generator 46.

An example of using an operation element for the address computation will be shown below.

---
Example of Program 5
---
for(i=0; i<256; i++){
    index=a[i]*b[i];
    out[i]=c[index]+d[i];
}
---

In the present embodiment, as shown in FIG. 9, after once performing the address computation by using the operation element 47, the address generator 45 utilizes the address and reads out data from the memory. Another operation element 48 acquires the final result. Further, it is also possible to perform a more complex address generation by further combining a conditional operation here.

Note that general processing of still images and moving images is basically carried out by 8-bit data, therefore the efficiency of utilization of the bus becomes poor in a system using a 32-bit bus. Therefore, in the present embodiment, the transfer efficiency/processing efficiency is improved by processing four data in a group taking note of the case of accumulation processing.

Figures 10, 11:
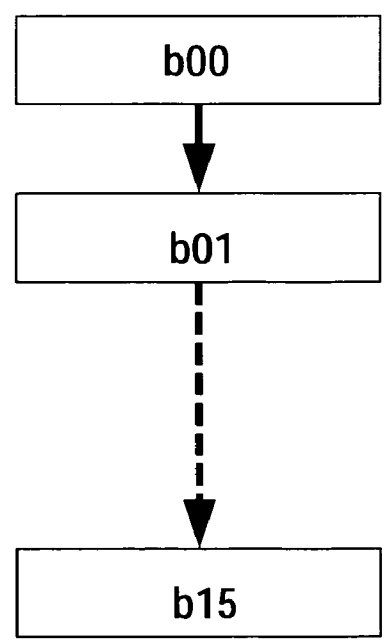
FIG. 10 is a diagram showing an example of an array of 8-bit data.
FIG. 11 is a diagram showing an example where the 8-bit data is read out one at a time.
Figure 12:
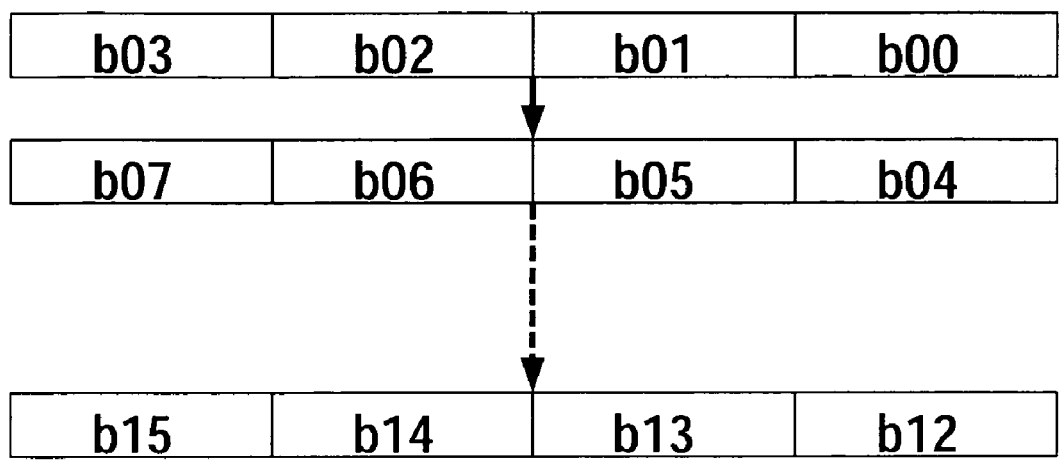
FIG. 12 is a diagram showing an example where the 8-bit data is read out four at a time.

For example, assumed that there are 16 8-bit data arranged in the memory as shown in FIG. 10. When performing processing by reading the data one at a time as usual, as shown in FIG. 11, 16 memory transfers occur. Contrary to this, as shown in FIG. 12, when reading out four data at a time, four transfers are sufficient.

Figure 13:
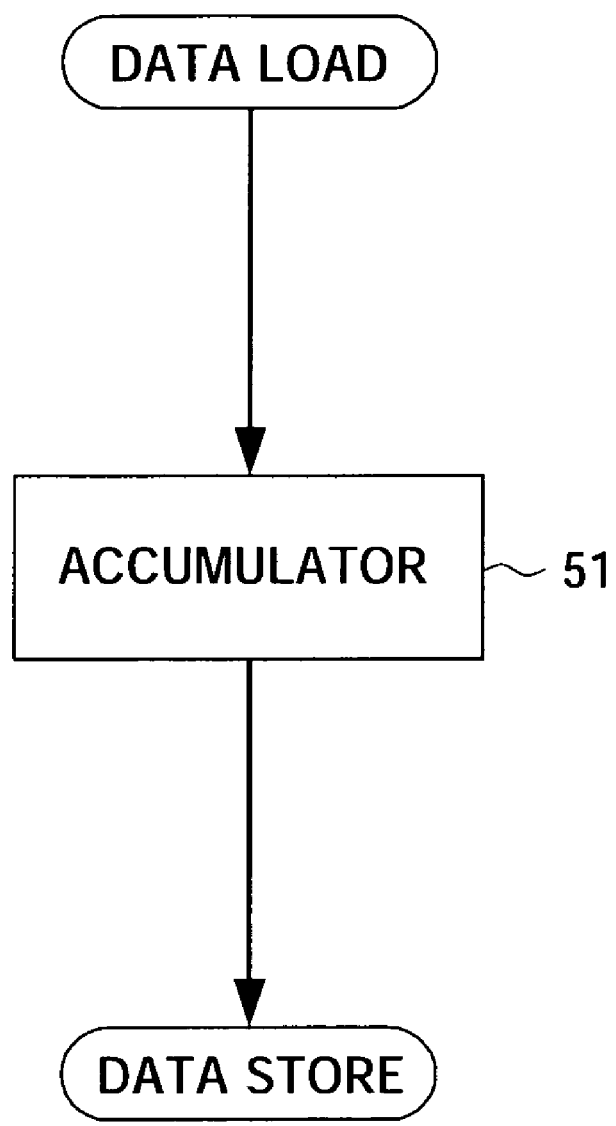
FIG. 13 is a diagram showing an example where the 8-bit data is processed one at a time.
Figure 14:
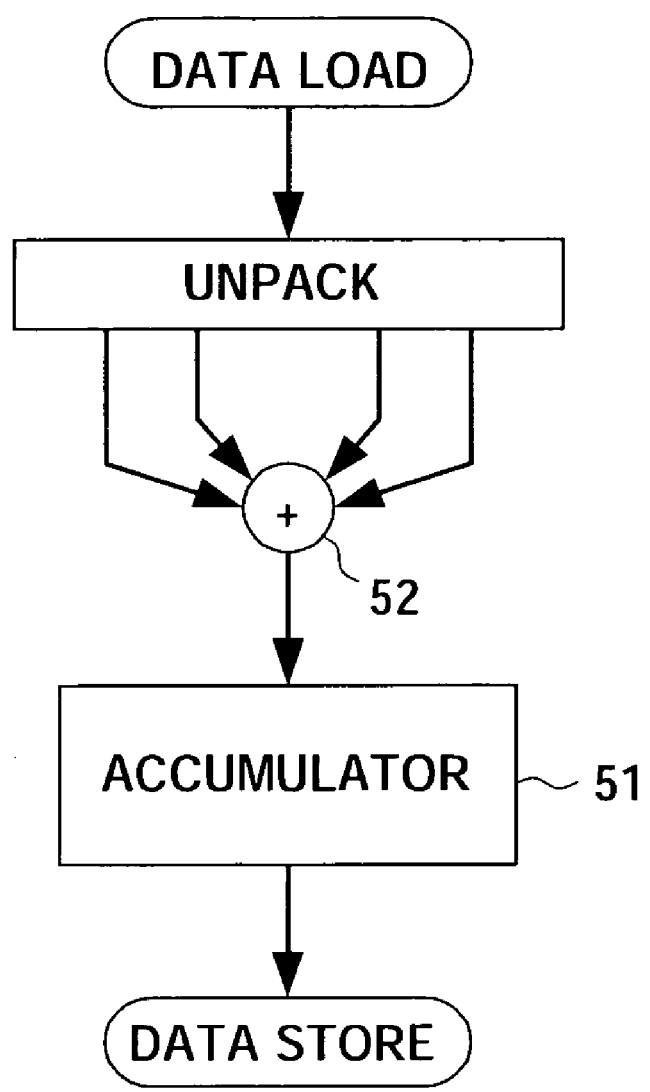
FIG. 14 is a diagram showing an example where the 8-bit data is processed four at a time.

FIG. 13 and FIG. 14 are processing block diagrams in the cases of reading out data one at a time and four at a time. In FIG. 13 and FIG. 14, 51 indicates an accumulator, and 52 indicates an adder.

Figure 15:
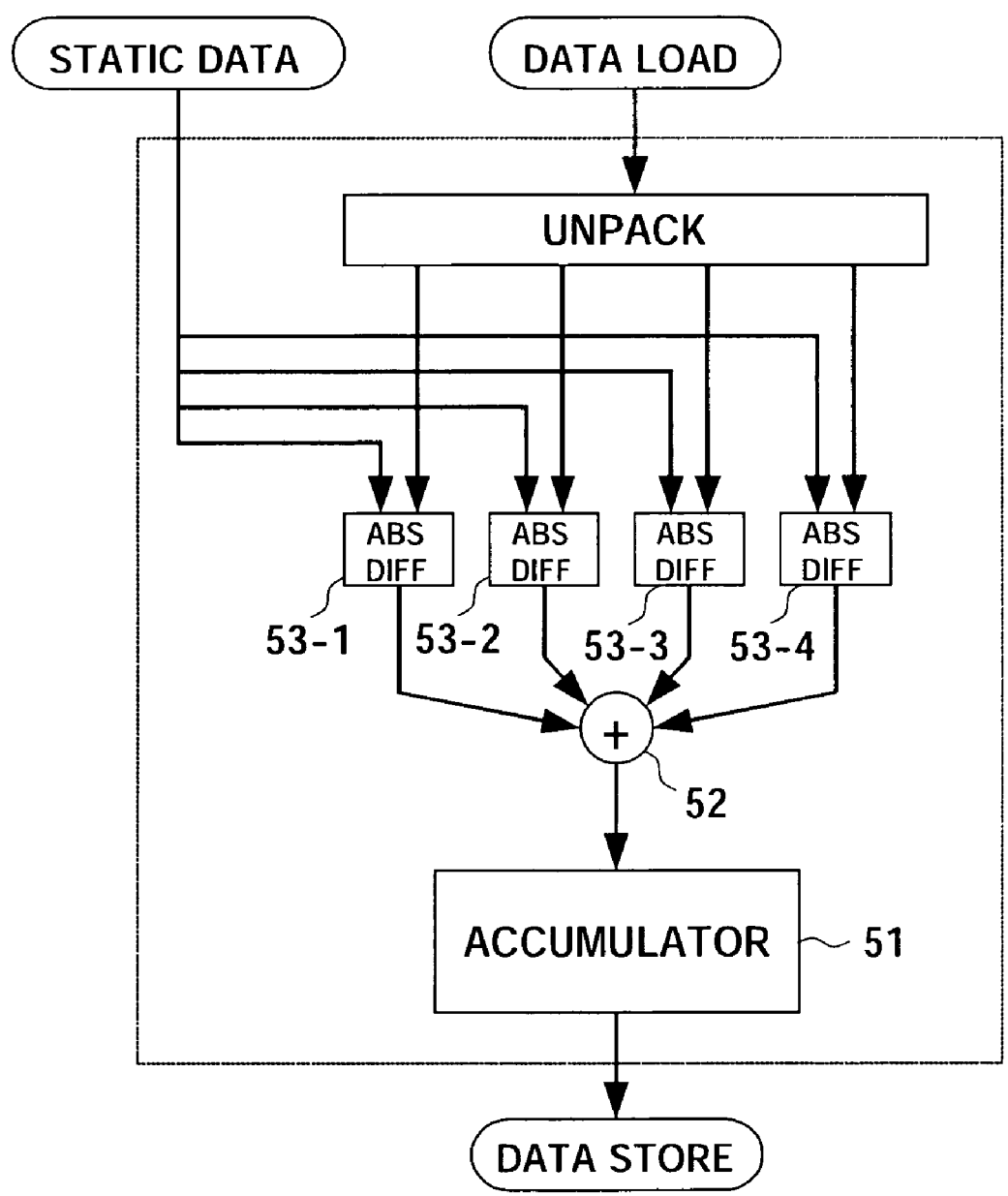
FIG. 15 is a diagram showing an example of finding a differential absolute value.

As shown in FIG. 14, when reading out data four at a time, the operation element separates the once grouped together data into four data, then adds them into one and accumulates this. Further, when finding the sum of differential absolute values with respect to reference data, frequently used in moving picture encoding etc., as shown in FIG. 15, it simultaneously finds four differential absolute values, adds them into one, then accumulates this. Note that, in FIG. 15, 53-1 to 53-4 indicate differential absolute value operation elements (AbsDiff). Note that this can also be applied to the case of 16-bit data. In this case, two 16-bit data are processed together.

When mounting a data flow type operation apparatus, the inside is often formed into a pipeline. Therefore, the latency until the final result is found becomes large. Accordingly, in such an operation apparatus, desirably continuous operation is carried out as much as possible. By making the conditional operation of the present embodiment possible, an operation which has been generally executed divided into a few times can be executed in just one time, so a highly efficient operation becomes possible.

On the other hand, by the method of accumulating a plurality of data while collecting them into one, it becomes possible to greatly reduce the amount of processing when processing a large amount of data such as when detecting motion in moving image encoding. This contributes to higher efficiency of the apparatus.

Below, an embodiment of a program for realizing a general secondary IIR filter and the IIR filter realized by specific hardware will be explained.

The following example is an example of a program for realizing a general secondary IIR filter.

Example of Program 6

```
y[0]=init_y2n;
y[1]=init_y1n;
for(i=2; i<smpl+2; i++){
    y[i]=a0*x[i]+a1*x[i-1]+a2*x[i-2]+b1*y[i-1]+b2*y[i-2];
}
```

When applying this program to hardware as it is, y[i−1] and y[i−2] will be read out from the memory. Further, these become polynomials, therefore a large amount of the operation resources is consumed. Therefore, an example of modifying the above example to an accumulation format and replacing y[i−1] and y[i−2] by registers will be shown below.

Example of Program 7

```
y2=init_y2n;
y1=init_y1n;
a[ ]={a2,a1,a0,b1,b2};
for(i=0; i<smpl; i++){
    y[i]=0;
    for(j=0; j<5; j++){
        if(j==3)y[i]+=a[j]*y1;
        else if(j==4)y[i]+=a[j]*y2;
        else y[i]+=a[j]*x[i+j];
    }
    y2=y1;
    y1=y[i];
}
```

Figure 16:
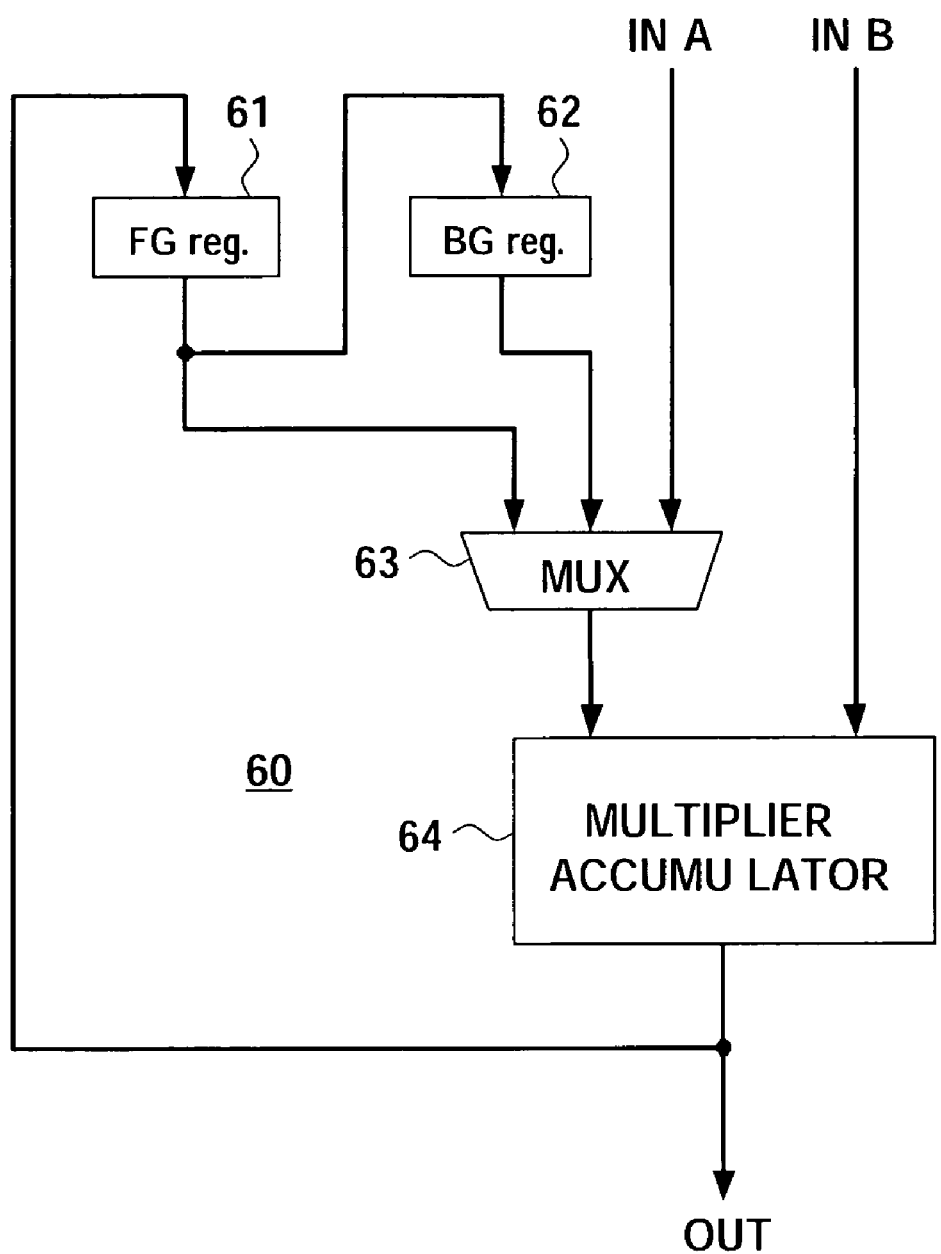
FIG. 16 is a diagram showing an example of the configuration of a general IIR filter.

FIG. 16 shows the resources and the connections which become necessary when realizing the above program by hardware.

An IIR filter 60 of FIG. 16 has registers 61 (FGreg) and 62 (BGreg), a multiplexer (MUX) 63, and a multiplier accumulator (MULTIPLIER/ACCUMULATOR) 64.

The register 61 holds the operation result of the multiplier accumulator 64, while the register 62 holds the held data of the register 61. The multiplexer 63 selects either of the registers 61 and 62 or the input data INA and inputs the same to the multiplier accumulator 64. The multiplier accumulator 64 performs the multiplication and accumulation of the selected data of the multiplexer 63 and an input data INB.

Figure 17:
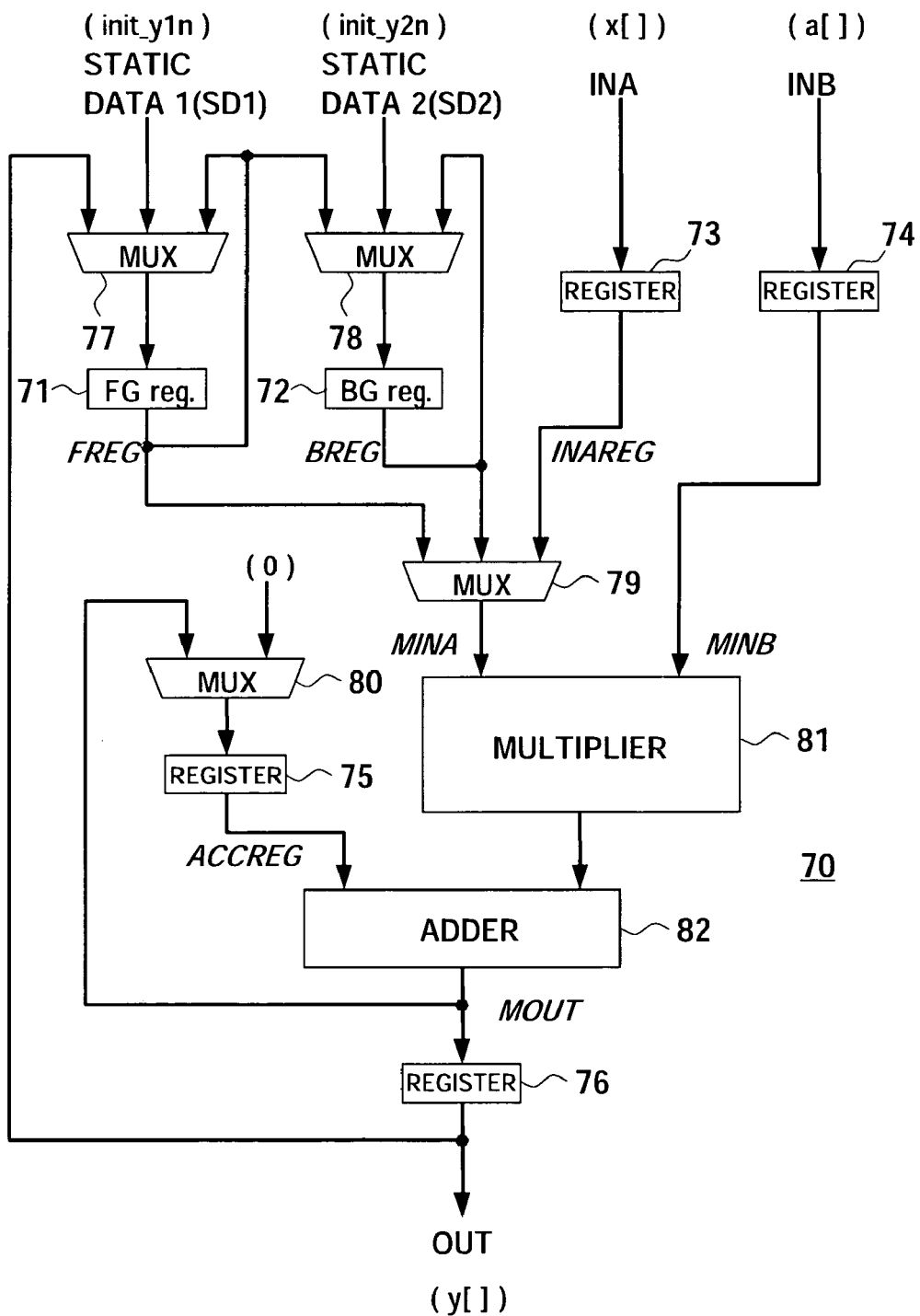
FIG. 17 is a diagram showing a more realistic embodiment including a pipeline register etc. necessary when realizing the IIR filter configuration of FIG. 16.

FIG. 17 is a diagram showing a more realistic embodiment including a pipeline register etc. necessary when realizing the IIR filter configuration of FIG. 16.

The IIR filter 70 of FIG. 17 has registers 71 to 76, multiplexers (MUX) 77 to 80, a multiplier 81, and an adder (ADDER) 82.

The register 71 (FGreg) holds the selected data of the multiplexer 77, while the register 72 (BGreg) holds the selected data of the multiplexer 78. The register 73 holds the input data INA, the register 74 holds the input data INB, the register 75 holds the selected data of the multiplexer 80, and the register 76 holds the operation result of the adder 82.

The multiplexer 77 selects either of the held data of the register 76, an input static data SD1, or the held data of the register 71 and outputs the same to the register 71. The multiplexer 78 selects either of the held data of the register 71, an input static data SD2, or the held data of the register 72 and outputs the same to the register 72. The multiplexer 79 selects either of the held data of the register 71, the held data of the register 72, or the held data of the register 73 and outputs the same to the multiplier 81. The multiplexer 80 selects the operation result of the adder 82 or the fixed value 0 and outputs the same to the register 75.

The multiplier 81 multiplies the selected data of the multiplexer 79 and the held data of the register 74 and outputs the same to the adder 82. The adder 82 adds the held data of the register 75 and the operation result of the multiplier 81 and outputs the same to the register 76 and the multiplexer 80.

The array represented by a[ ] and x[ ] in the example of program 7 becomes the input data in FIG. 16 and FIG. 17, while y[ ] becomes the output data. Further, the variables represented by y1 and y2 correspond to the registers in the figure and are represented as FGreg (61, 71) and BGreg (62, 72).

The example of program 7 performs the condition branching using an argument of the array in the loop. When rewriting this into a format using a control signal added to the data as in the characterizing feature of the present invention, this becomes the following example of program 8.

Example of Program 8

```
a[ ]={a2,a1,a0,b1,b2};
bctl1[ ]={1,0,0,0,0};
bctl2[ ]={0,0,0,1,1};
bctl3[ ]={0,0,0,0,1};
INA_CTL1=1;
for(i=0; i<smpl; i++){
    for (j=0; j<5; j++){
        INA=x[i+j];
        INB=a[j];
        INB_CTL1=bctl1[j];
        INB_CTL2=bctl2[j];
        INB_CTL3=bctl3[j];
        if(INA_CTL1==1){
            FREG=init_y1n;
            BREG=init_y2n;
```

-continued

Example of Program 8

```
    if(INB_CTL1==1)ACCREG=0;
    if(INB_CTL2==1&&INB_CTL3==1)ACCREG+=BREG*INB;
    else f(INB_CTL2=1&&INB_CTL3==0)ACCREG+=FREG*INB;
    else ACCREG+=INA*INB;
    OUT=ACCREG;
    if(INB_CTL2==1&&INB_CTL3==1){
       BREG=FREG;
       FREG=OUT;
    }
    if(INA_CTL1==1)INA_CTL1=0;
  }
  y[i]=OUT;
}
```

In the example of program 8, the portions of "if . . ." and "else . . ." represent operations in the embodiment of FIG. 17. In this example, the initial values are set and the operands are selected according to several conditions combining four control signals.

Sixth Embodiment

Figure 18:
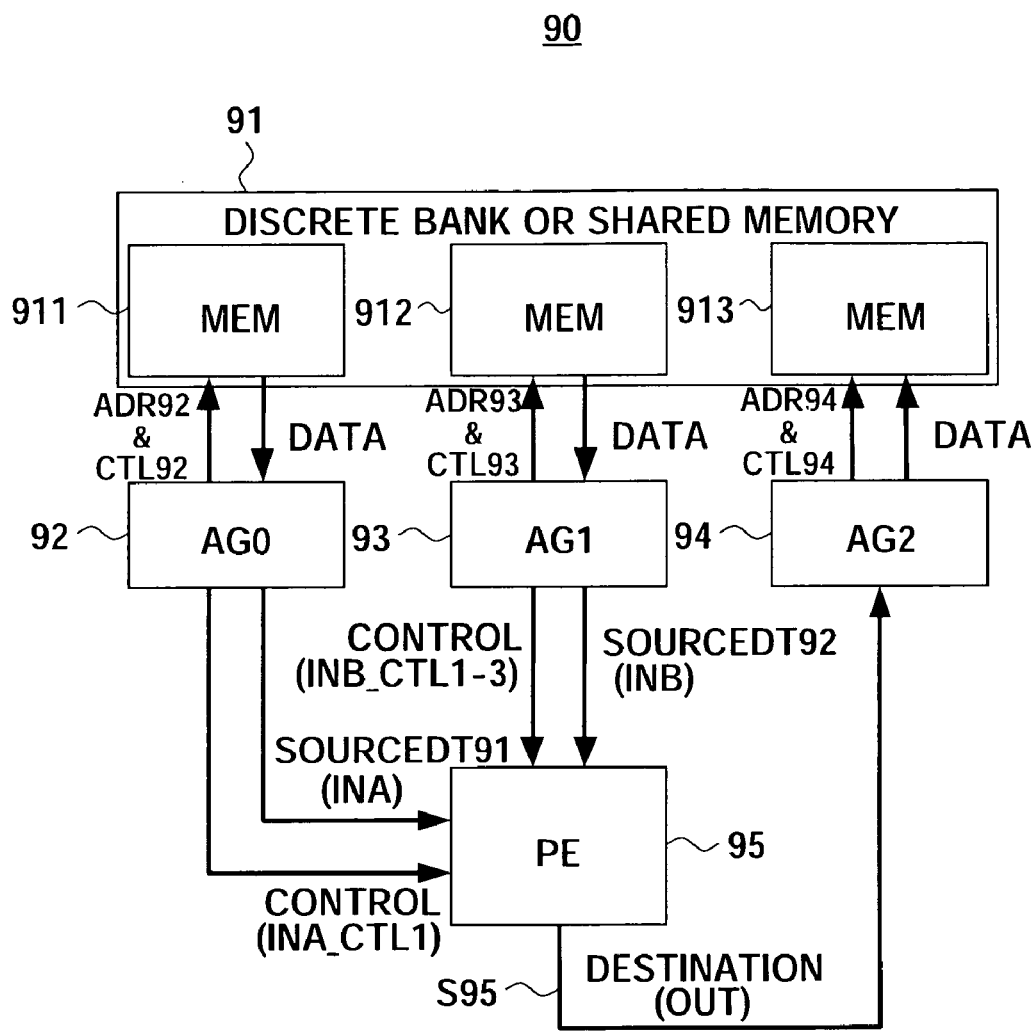
FIG. 18 is a view of the configuration of a data flow type operation apparatus according to a sixth embodiment of the present invention.

FIG. 18 is a view of the configuration of a data flow type operation apparatus according to a sixth embodiment of the present invention.

FIG. 18 shows an example of the configuration realizing the example of program 8. In this example, the apparatus 70 of FIG. 17 is used as the main operation element (PE). This is combined with a memory and the address generators (AG).

An operation apparatus 90 has a memory 91 provided with a plurality of (three in FIG. 9) banks 911 to 913, first to third address generators 92 (AG0), 93 (AG1), and 94 (AG2) provided corresponding to the banks 911 to 913, and an operation element (PE) 95.

The address generator 92 gives an address ADR92 and a control signal CTL92 to the bank 911, reads out the first data for operation by the operation element 95, and outputs this as first source data DT91 (INA) to the operation element 95 together with the operation control signal INA_CTL1.

The address generator 93 gives an address ADR93 and a control signal CTL93 to the bank 912, reads out the second data for operation by the operation element 95, and outputs this as second source data DT92 (INB) to the operation element 95 together with the operation control signals INB_CTL1~3.

The address generator 94 gives an address ADR94 and a control signal CTL94 to the bank 913 and stores the operation result of the operation element 95 in the bank 913.

The operation element 95 performs for example the conditional operation shown in the above example of program with respect to the first source data DT91 (INA) from the address generator 92 and the second source data DT92 (INB) from the address generator 93 in accordance with the control signals INA_CTL1 and INB_CTL1~3 and outputs the operation result S95 (Destination) to the address generator 94.

Figure 19:
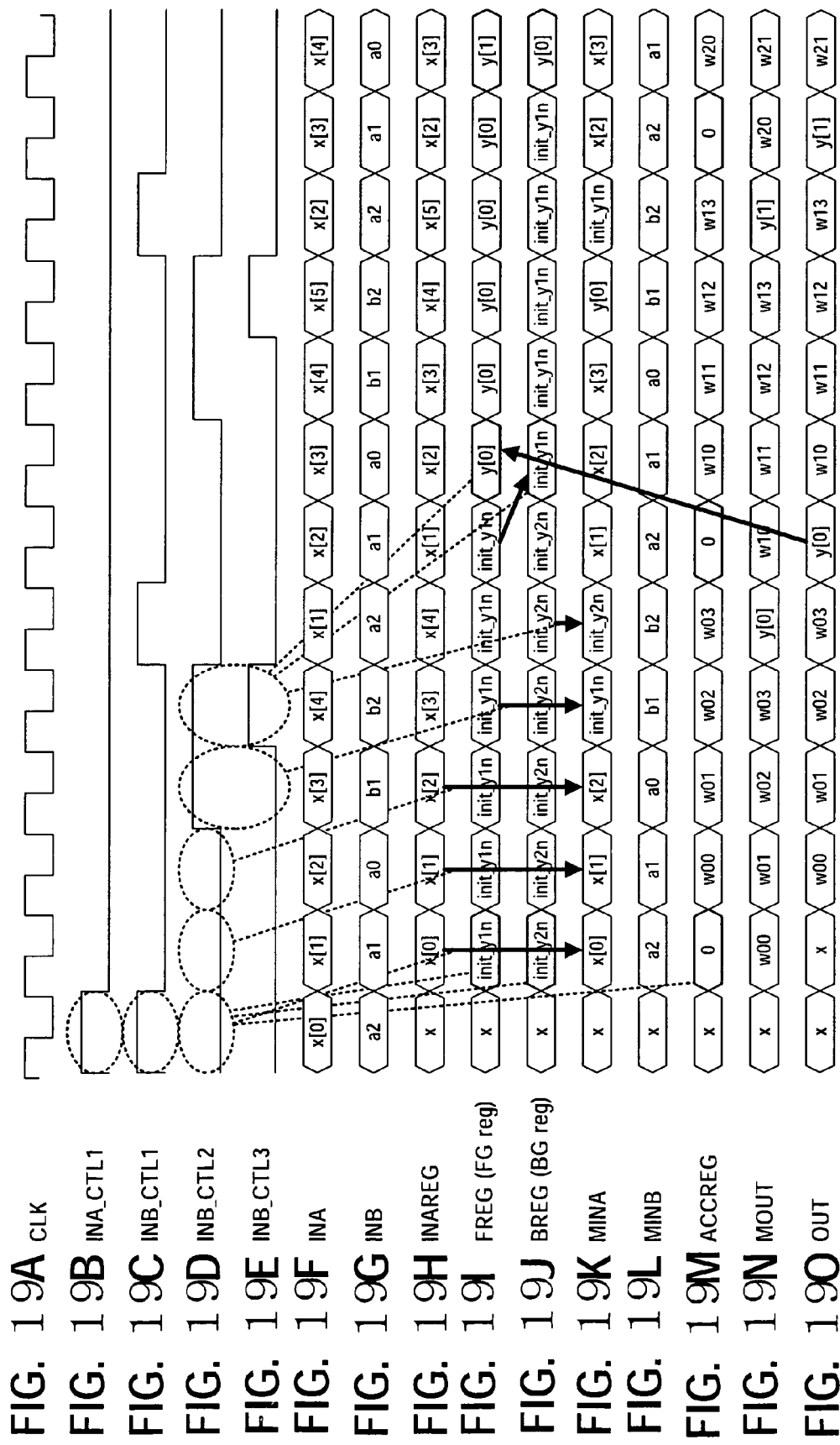
FIG. 19A to FIG. 19O are operation waveform diagrams of an operation apparatus of FIG. 18.

FIG. 19A to FIG. 19O are diagrams showing operation waveforms of the operation apparatus 90 of FIG. 18.

The operation element 95 has two data inputs INA and INB. Four signals INA_CTL1, INB_CTL1, INB_CTL2, and INB_CTL3 are used as control signals. These are generated by the address generators 92 and 93. The control signal INA_CTL1 is generated by the address generator 92, while the control signals INB_CTL1~3 are generated by the address generator 93, and these are input together with the data to the operation element 95.

The control signal INA_CTL1 is a signal for initializing internal registers 71 (FGreg) and 72 (BGreg) shown in FIG. 17. INA_CTL1 becomes equal to 1 only one initial time usually. The control signal INB_CTL1 is a signal for clearing an accumulator register 75 (ACCREG) as shown in FIG. 19M. INB_CTL1 becomes equal to 1 at a timing when the first data is input when the accumulation is carried out five times in the case of the example of program 8. The control signal INB_CTL2 and the control signal INB_CTL3 are signals for selecting the multiplier from among the three register 73 (INA), register 71 (FGreg), and register 72 (BGreg) and is also used for updating the internal register 71 (FGreg) and register 72 (BGreg) simultaneously with that.

In the example of the configuration of FIG. 18 for realizing the example of program 8, the result is obtained at a ratio of one time per five cycles, but by using two operation elements and operating them in the form of a pipeline, the number of cycles necessary for obtaining the result can be reduced. The operation at this time becomes as in the example of program 9 by modifying the example of program 8.

Example of Program 9

```
    a[ ]={a2,a1,a0};
    b[ ]={b0,b1,b2};
    bctl1[ ]={1,0,0};
    bctl2[ ]={0,1,1};
    bctl3[ ]={0,0,1};
    INOB_CTL1=1;
    for(i=0; i<smpl; i++){
       (j=0; j<3; j++){
         IN0A=x[i+j];
         IN0B=a[j];
         IN0B_CTL2=bctl1[j];
//---------------- PE0 ---------------------
         if(IN0B_CTL2==1)ACCREG0=0;
         ACCREG0+=IN0A*IN0B;
         OUT0=ACCREG0;
//--------------------------------------------
    }
    w[i]=OUT0;
    for (j=0; j<3; j++){
       IN1A=OUT0;
       IN1B=b[j];
       IN1A_CTL1= IN0B_CTL1;
       IN1B_CTL1=bctl1[j];
       IN1B_CTL2=bctl2[j];
       IN1B_CTL3=bctl3[j];
//-------------------- PE1 --------------------
       if(IN1A_CTL1==1){
          FREG1=init_y1n;
          BREG1=init_y2n;
       if(IN1B_CTL1==1)ACCREG1=0;
       if(IN1B_CTL2==1&&IN1B_CTL3==1)
       ACCREG1+=BREG1*IN1B;
       else
       if(IN1B_CTL2==1&&IN1B_CTL3==0)ACCREG1+=FREG1*IN1B;
       else ACCREG1+=IN1A*IN1B;
       OUT1=ACCREG1;
       if(IN1B_CTL2==1&&IN1B_CTL3==1){
          BREG1=FREG1;
          FREG1=OUT1;
       }
//--------------------------------------------
       if(IN1A_CTL1==1)IN1A_CTL1=0;
    }
    y[i]=OUT1;
}
```

In the example of program 9, the first halves of portions of "if . . ." and "else . . ." are for accumulating usual multiplication results and are assigned to one operation (processing)

element PE0. The latter halves use the embodiment of FIG. 18 and assigned to one another operation element PE1.

Figure 20:
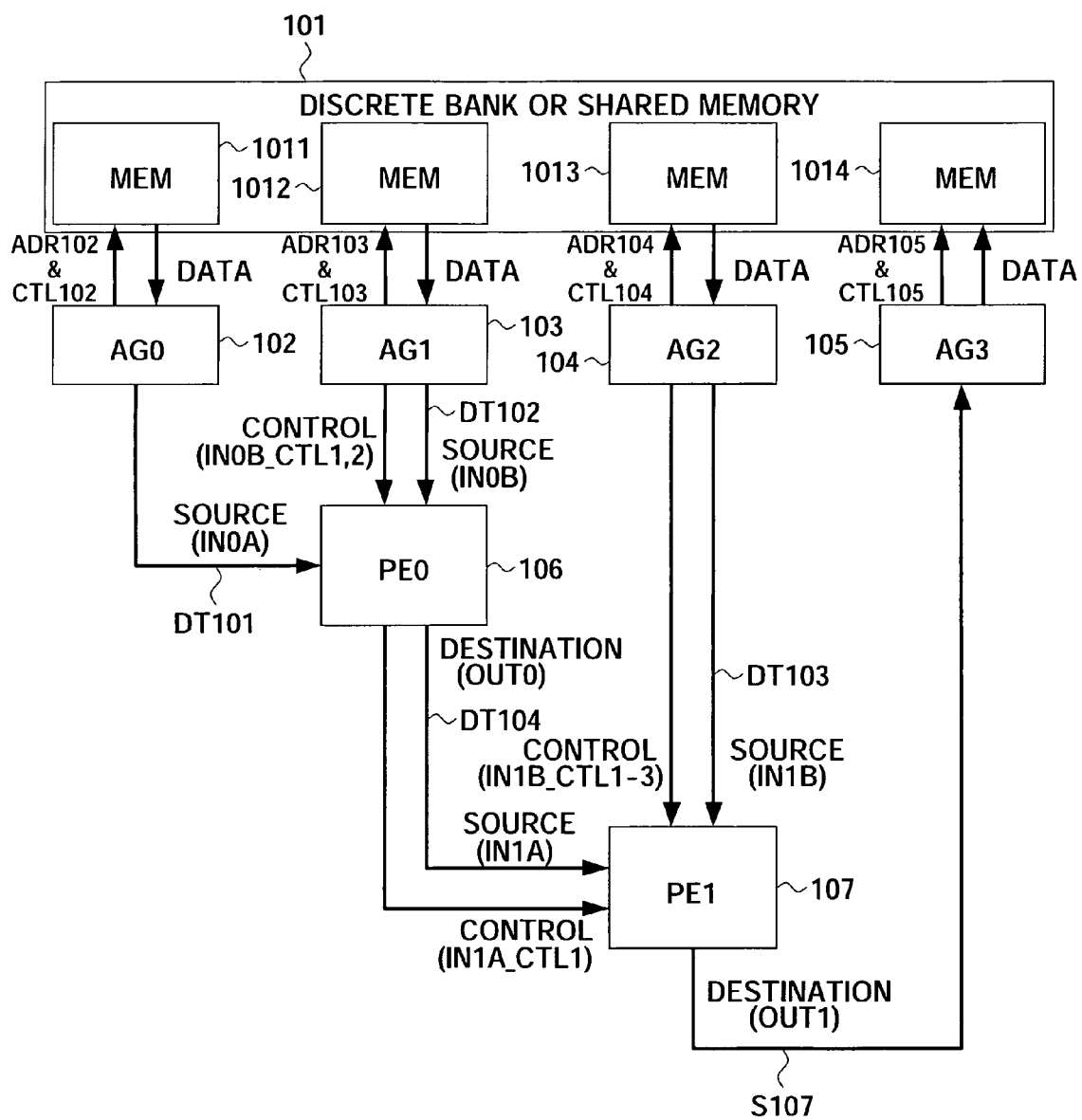
FIG. 20 is a view of the configuration of a data flow type operation apparatus according to a seventh embodiment of the present invention.

The configuration at this time is shown in FIG. 20. A seventh embodiment will be explained with reference to FIG. 20.

Seventh Embodiment

FIG. 20 is a view of the configuration of a data flow operation apparatus according to a seventh embodiment of the present invention.

An operation apparatus 100 has a memory 101 provided with a plurality of (four in FIG. 20) banks 1011 to 1014, first to fourth address generators 102 (AG0), 103 (AG1), 104 (AG2), and 105 (AG3) provided corresponding to the banks 1011 to 1014, a first operation element 106 (PE0), and a second operation element 107 (PE1).

The address generator 102 gives an address ADR102 and a control signal CTL102 to the bank 1011, reads out the first data for operation by the operation element 106, and outputs this as first source data DT101 (IN0A) to the operation element 106.

The address generator 103 gives an address ADR103 and a control signal CTL103 to the bank 1012, reads out the second data for operation by the operation element 106, and outputs this as second source data DT102 (IN0B) to the operation element 106 together with the operation control signals IN0B_CTL1,2.

The address generator 104 gives an address ADR104 and a control signal CTL104 to the bank 1013, reads out the third data for operation by the operation element 107, and outputs this as third source data DT103 (IN1B) to the operation element 107 together with the operation control signals IN1B_CTL1~3.

The address generator 105 gives an address ADR105 and a control signal CTL105 to the bank 1014 and stores the operation result S107 of the operation element 107 in the bank 1014.

The operation element 106 generates a fourth source data DT104 (IN1A) by for example predetermined operation with respect to the first source data DT101 (IN0A) from the address generator 102 and the second source data DT102 (IN0B) from the address generator 103 in accordance with the control signals IN0B_CTL1,2 and outputs this together with the control signal IN1A_CTL1 to the operation element 107.

The operation element 107 performs predetermined operation with respect to the third source data DT103 (IN1B) from the address generator 104 and the fourth source data DT104 (IN1A) from the operation element 106 in accordance with control signals IN1B_CTL1~3 and control signal IN1A_CTL1 and outputs the operation result S107 (Destination) to the address generator 105.

In the operation apparatus 100 of FIG. 20, by making the operation result of the operation element (PE0) 106 as one input of the operation element (PE1) 107, pipeline operation becomes possible and the throughput is improved.

Figure 21:
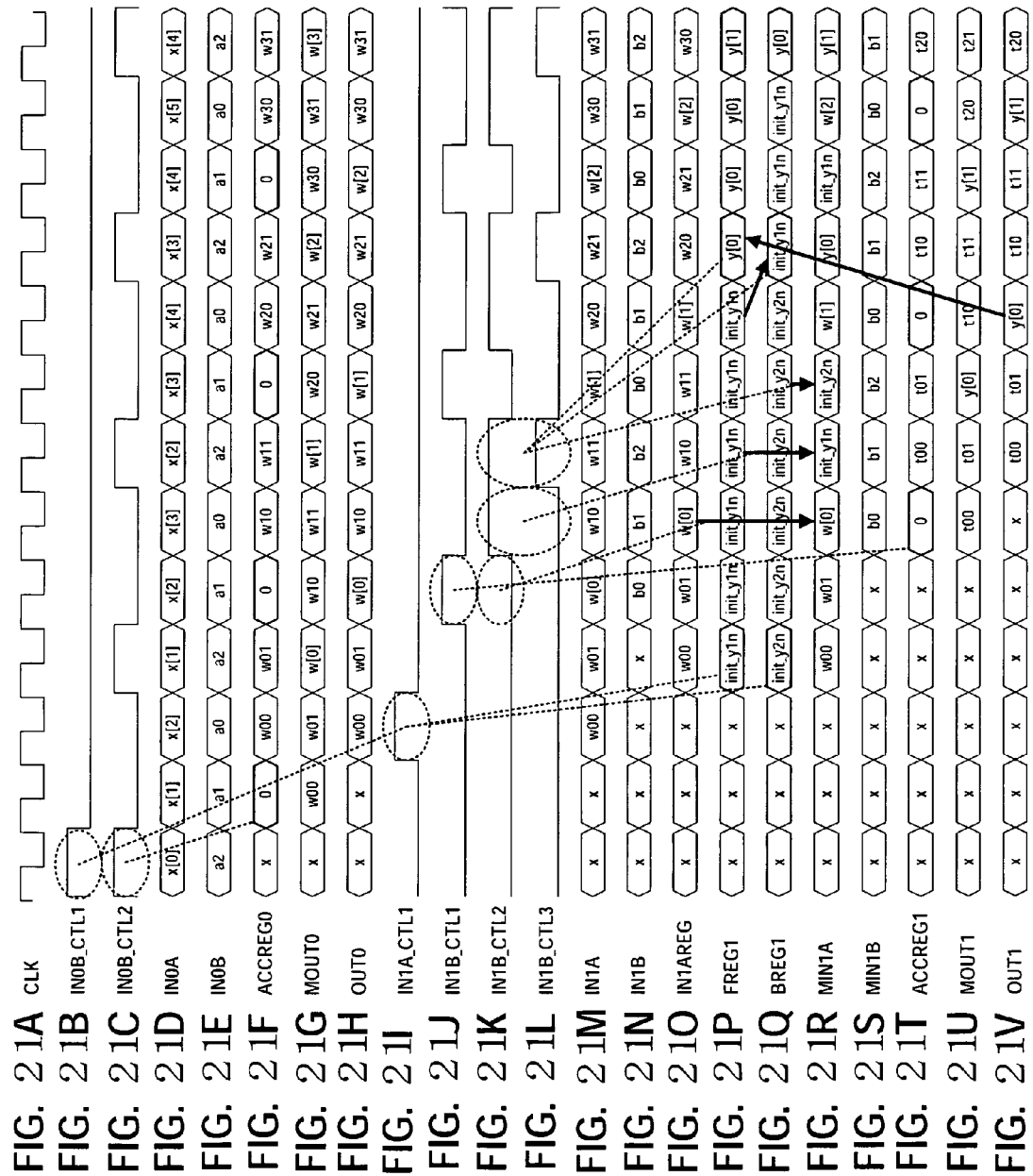
FIG. 21A to FIG. 21V are operation waveform diagrams of the operation apparatus of FIG. 20.

FIG. 21A to FIG. 21V are diagrams showing operation waveforms of the operation apparatus 100 of FIG. 20.

The operation element (PE0) 106 performs multiplication and performs accumulation and addition using IN0A and IN0B as inputs, but it is necessary to initialize the accumulation result for every three samples, so IN0B_CTL1 is generated by the address generator 102 as the control signal thereof.

The output OUT0 of the operation element (PE0) 106 is connected to IN1A of the operation element (PE1) 107, but in the operation element (PE1) 107, a control signal in synchronization with IN1A becomes necessary, therefore the control signal is input in a form passing it through the operation element (PE0) 106. The control signal IN0B_CTL2 in the operation element (PE0) 106 corresponds to this. The control signal generated by the address generator 103 is used for the initialization of the registers 71 and 72 (FREG1 and BREG1: FGreg, BGreg) in the operation element (PE1) 107.

Further, when viewed from the viewpoint of the time axis, the input IN1A of the operation element (PE1) 107 is delayed by the amount of delay of the pipeline of the operation element (PE0) 106. It is necessary to wait for two cycles until the result of accumulation is decided. Therefore, the start of operation in the operation element (PE1) 107 is delayed by four cycles with respect to the operation element (PE0) 106.

In the case of the example of configuration of FIG. 20, by delaying the operation of the address generator 104 with respect to the address generators 102 and 103 by four cycles, such an operation can be accomplished. The operation of the other operation element (PE) 107 is the same as the operation in the example of configuration of FIG. 18.

Figure 22:
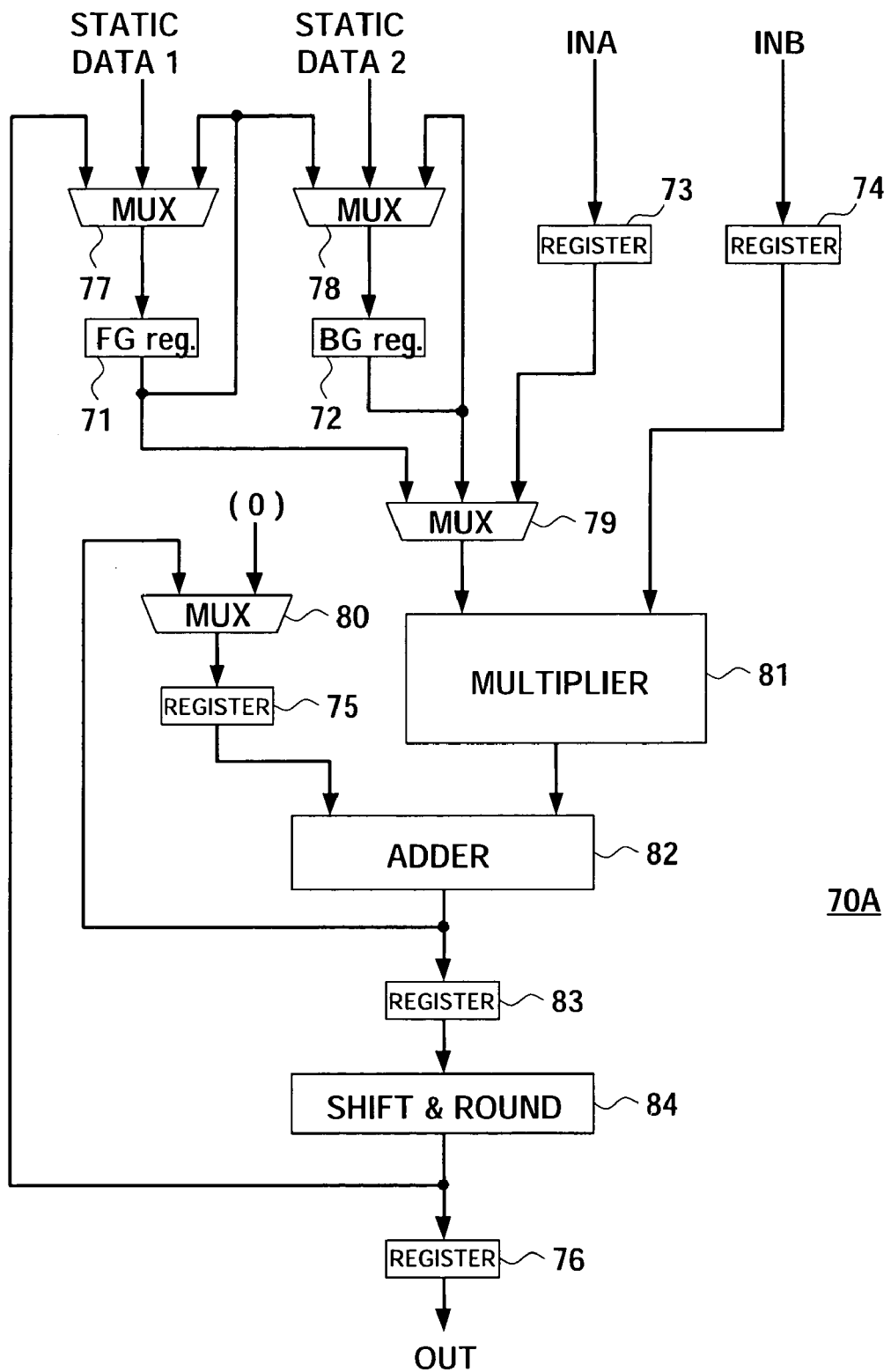
FIG. 22 is a diagram showing an example of the configuration adding shift and rounding processing to the configuration of FIG. 17 to enable processing by fixed decimal places.

Note that, in general signal processing, operations are frequently carried out by fixed decimal places. In this case, as shown in FIG. 22, the operation can be easily accomplished by adding shift and rounding processing to the configuration of FIG. 17. In the apparatus 70A of FIG. 22, a register 83 and a shift and rounding operation element 84 are provided between the adder 82 and the register 76 as compared with the configuration of FIG. 17.

As described above, when mounting a data flow type operation apparatus, the inside is formed into a pipeline in many cases, therefore the latency until the final result is found becomes large. Accordingly, desirably continuous operation is carried out as much as possible in such an operation apparatus. By making the conditional operation of the present invention possible, an operation which has been generally executed divided into a few times can be executed in just one time, so a highly efficient operation becomes possible.

On the other hand, by the method of accumulating a plurality of data while collecting them into one, it becomes possible to greatly reduce the amount of processing when processing a large amount of data such as when detecting motion in moving image encoding. This contributes to higher efficiency of the system. Further, if trying to apply processing accompanied by a feedback such as IIR filter to hardware as it is, it was necessary to once write the operation result into the memory and then read out the result again from the memory, so there was the defect that a dual port memory became indispensable and the system cost became higher. Further, in a system with a large latency of memory→operation→memory due to internal pipelining, it was necessary to wait until all of the data was prepared before starting the operation, so the operation apparatus was poor in efficiency. Contrary to this, when applying the present invention, it is not necessary to use a dual port memory, therefore there are the advantages that the system costs can be suppressed and more efficient processing is possible, so it is possible to reduce the processing time and the power consumption.

Below, a specific example of the configuration of the address generator employed in the above embodiments will be explained.

Figure 23:
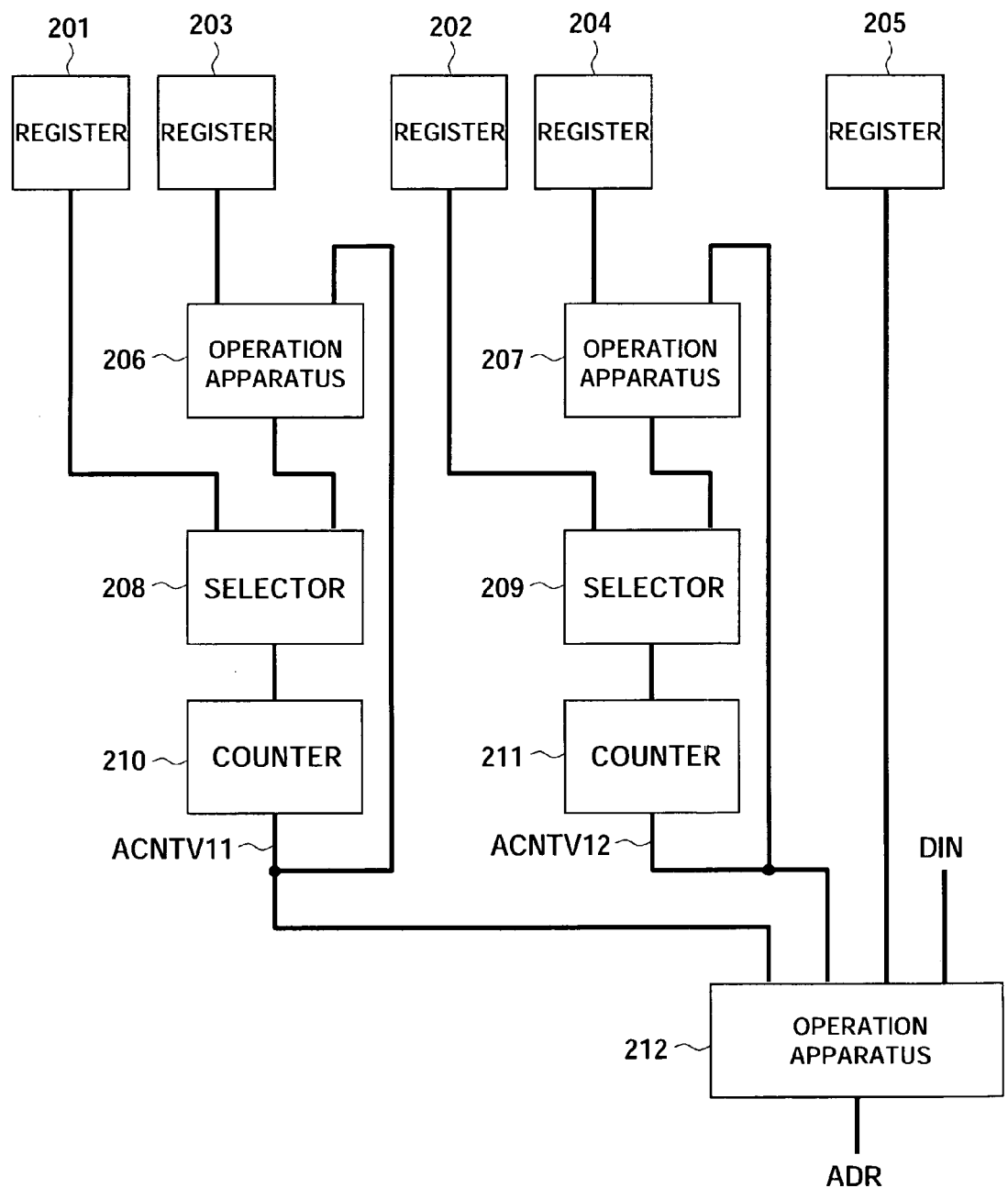
FIG. 23 is a diagram showing an example of the configuration of an address generator for generating an address based on input data like an address generator 14 of FIG. 1 and an address generator 46 of FIG. 9.

FIG. 23 is a diagram showing an example of the configuration of an address generator for generating an address based on input data like for example the address generator 14 of FIG. 1, the address generator 46 of FIG. 9, the address generator 94 of FIG. 18, and the address generator 105 of FIG. 20.

An address generator 200 of FIG. 23 has registers 201 and 202 for setting initial values, registers 203 and 204 for setting step values, a register 205 for setting a fixed value, operation apparatuses 206 and 207, selectors 208 and 209, counters 210 and 211, and an operation apparatus 212.

The operation apparatus 206 performs predetermined operation, for example addition, based on the step value of the register 203 and the value fed back from the counter 210 and outputs the operation result to the selector 208.

The operation apparatus 207 performs predetermined operation, for example addition, based on the step value of the register 204 and the value fed back from the counter 211 and outputs the operation result to the selector 209.

The selector 208 selects either of the set value of the register 201 or the output of the operation apparatus 206 based on a not shown control signal and outputs it to the counter 210.

The selector 209 selects either of the set value of the register 202 or the output of the operation apparatus 207 based on a not shown control signal and outputs it to the counter 211.

The counter 210 sets a count value according to the set value (initial value) of the register 201 or the value of the operation result of the operation apparatus 206 selected by the selector 208, feeds back this value to the operation apparatus 206, and then outputs it as a first address count value ACNTV11 to the operation apparatus 212.

The counter 211 sets the count value according to the set value (initial value) of the register 202 or the value of the operation result of the operation apparatus 207 selected by the selector 209, feeds back this value to the operation apparatus 207, and then outputs it as a second address count value ACNTV12 to the operation apparatus 212.

The operation apparatus 212 performs predetermined operation based on the first address count value ACNTV11 from the counter 210, the second address count value ACNTV12 from the counter 211, the fixed value set in the register 205, and the input data DIN based on the not shown control signal and calculates the address ADR.

Here, the address generation operation of the address generator 200 of FIG. 23 will be explained with reference to the timing charts of FIG. 24A to FIG. 24G.

FIG. 24A shows a count value CNT210 of the counter 210; FIG. 24B shows a count value CNT211 of the counter 211, FIG. 24C shows a first address count value ACNTV11, FIG. 24D shows a second address count value ACNTV12, FIG. 24E shows a fixed value SCV set in the register 205, FIG. 24F shows the input data DIN to the operation apparatus 212, and FIG. 24G shows the address ADR calculated in the operation apparatus 212.

An address is generated as follows. 0 is stored as the initial value of the counter in the register 201 and the register 202, and 1 is stored as the step value in the register 203 and the register 204.

The operation apparatus 206 and the operation apparatus 207 execute the addition. The operation apparatus 208 selects the value of the register 201 at three-cycle intervals and selects the value of the operation apparatus 206 at times other than this. The operation apparatus 209 typically selects the value of the operation result of the operation apparatus 207.

Due to this, the count values CNT210 and CNT211 of the counter 210 and the counter 211 take values as shown in FIG. 24A and FIG. 24B. By operation in this way, the first address count value ACNTV11 and the second address count value ACNTV12 take values as shown in FIG. 24C and FIG. 24D.

Further, as shown in FIG. 24E and FIG. 24F, 0 is set as the fixed value in the register 205, and every cycle input data DIN (0, 1, 0, 1, 2, 0, 1, 2, 3 . . . ) are supplied. Then, the operation apparatus 212 executes the following operation to calculates the address ADR.

$$ADR = ACNTV11 + ACNTV12 + SCV + DIN \qquad (1)$$

Here, as the input data DIN, it is possible to use data read out from the memory using a not shown other address generator or data read out from the memory as in the present embodiment and subjected to predetermined operation.

As the operation executed in the operation apparatus 211, general operation such as subtraction or multiplication is also possible. It is clear that the present invention is not limited to addition.

According to the present example, in comparison with the simple address pattern generated in a general digital signal operation apparatus or the like, a complex address pattern can be generated.

Figure 25:
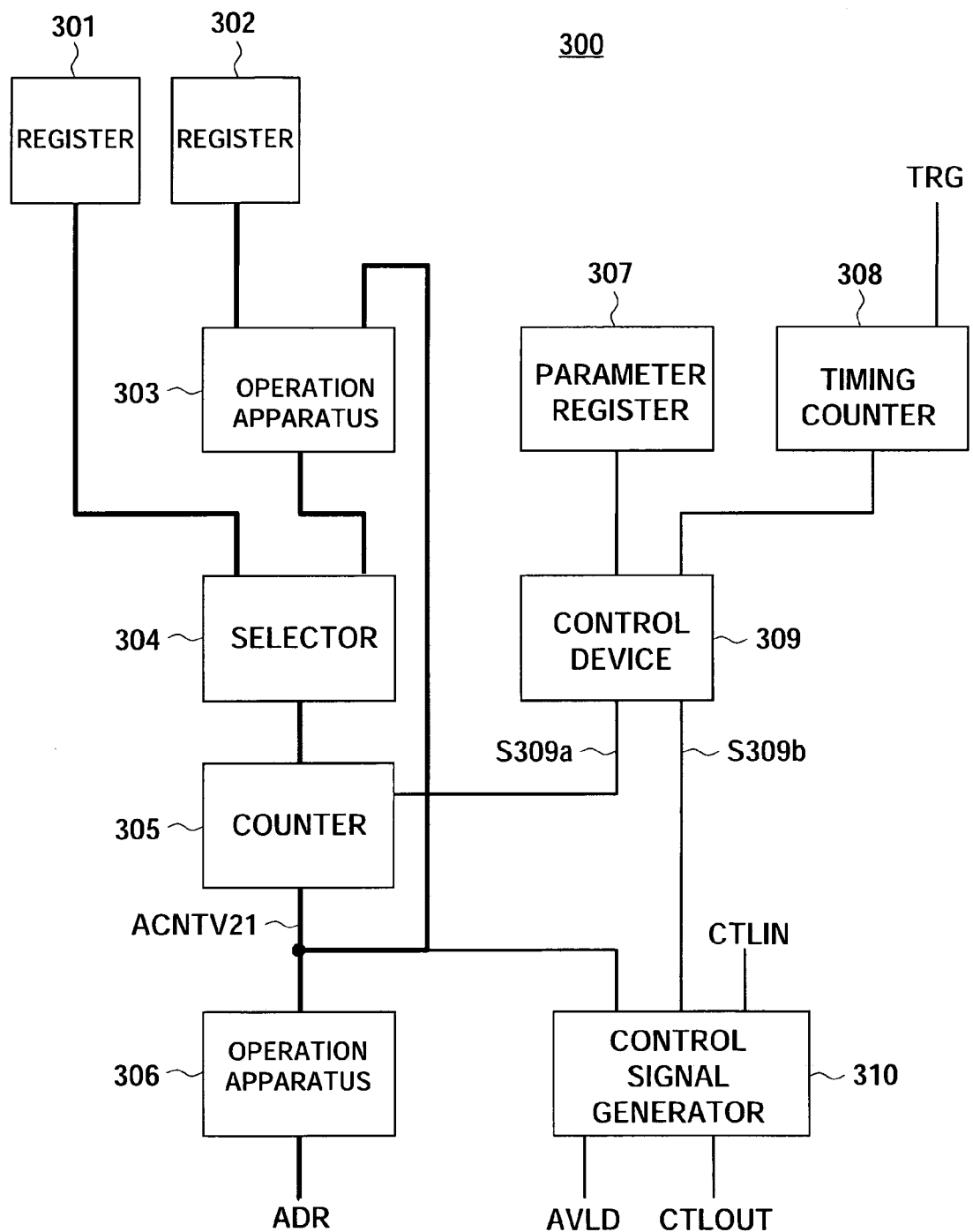
FIG. 25 is a diagram showing an example of the configuration of an address generator able to generate a control signal like an address generator 13 of FIG. 1 and an address generator 43 of FIG. 9.

FIG. 25 is a diagram showing an example of the configuration of an address generator able to generate a control signal like for example the address generator 13 of FIG. 1, the address generator 43 of FIG. 9, the address generators 92 and 93 of FIG. 18, and the address generators 103 and 104 of FIG. 20.

An address generator 300 has a register 301 for setting an initial value, a register 302 for setting a step value, an operation apparatus 303, a selector 304, a counter 305, an operation apparatus 306, a parameter register 307, a timing counter 308, a controller 309, and a control signal generator 310. Further, as the input, it has an activation signal TRG and a control input CTLIN.

The operation apparatus 303 performs predetermined operation, for example addition, based on the step value of the register 302 and the value fed back from the counter 305 and outputs the operation result to the selector 304.

The selector 304 selects either of the set value of the register 301 or the output of the operation apparatus 303 based on a not shown control signal and outputs it to the counter 305.

The counter 305 sets a count value according to the set value (initial value) of the register 301 or the value of the operation result of the operation apparatus 303 selected by the selector 304, feeds back this value to the operation apparatus 303, and then outputs it as a first address count value ACNTV21 to the operation apparatus 306 and the control signal generator 310. The counter 305 starts a count operation in response to a control signal S309a from the controller 309.

The operation apparatus 306 performs predetermined operation based on the first address count value ACNTV21 from the counter 305 and calculates the address ADR based on a not shown control signal.

The parameter register 307 is set with an address generation delay value from the outside.

The timing counter 308 counts up the count value when the activation signal TRG is input and counts the time for delaying the address generation until the value set in the parameter register 307 is obtained.

The controller 309 judges whether or not the count value CNT308 of the timing counter 308 reaches the predetermined delay value set in the parameter register 307, outputs the control signal S309a to the counter 305 when judging that the count value has been reached, and validates the count of the counter 305. Further, the controller 309 outputs a control signal S309b to the control signal generator 310 after the timing count value CNT308 of the timing counter reaches the set value and validates the address validity signal AVLD.

The control signal generator 310 generates the address validity signal AVLD from the control input CTLIN and this valid state. The control signal generator 310 makes the address validity signal AVLD valid in response to the control signal S309b from the control device 309 and makes the address validity signal AVLD invalid when the count value of the counter 305, that is, the first address count value ACNTV21, reaches a predetermined end value. The control signal generator 310 can make the control output CTLOUT valid or invalid when the count value of the counter 305 becomes a specific value.

Here, the address generation operation in the address generator 300 of FIG. 25 will be explained with reference to the timing charts of FIG. 26A to FIG. 26G. FIG. 26A shows the activation signal TRG given to the timing counter 308, FIG. 26B shows the timing count value CNT308 given to the timing counter 308, FIG. 26C shows the first address count value ACNTV21 from the counter 305, FIG. 26D shows the address ADR calculated in the operation apparatus 306, FIG. 26E shows the address validity signal AVLD generated at the control signal generator 310, FIG. 26F shows the control input CTLIN, and FIG. 26G shows the control output CTLOUT.

An address is generated as follows. An address generation delay value "4" is set in the parameter register 307. As shown in FIG. 26A, an activation signal TRG serving as a trigger signal input from the outside is used to start the count up of the timing counter 308. Then, as shown in FIG. 26B, when the count value CNT308 of the timing counter 308 reaches a predetermined delay value "4" set in the parameter register 307, the control signal S309a is output to the counter 305 to validate the count up of the counter 305 so that the address generation counter 305 may operate.

0 is stored in the register 301 as the initial value of the counter, and 2 is stored in the register 302 as the step value. The operation apparatus 303 executes for example addition. The selector 304 typically selects the value of the operation apparatus 303. By operation in this way, the first address count value ACNTV21 takes the value as shown in FIG. 26C.

The operation apparatus 306 calculates the address ADR by using the first address count value ACNTV21.

It is also possible to output an address validity signal AVLD/control output CTLOUT parallel to the above address operation. As shown in FIG. 26E to FIG. 26G, the address validity signal AVLD is generated by the controller 309 and the control signal generator 310 based on the control input CTLIN, the activation signal TRG, and the timing count value CTL308.

The controller 309 makes the address validity signal AVLD valid by the control signal S309b after the timing count value CNT308 reaches the set value and makes the address validity signal AVLD invalid when the count value of the counter 305 reaches the end value.

The control signal generator 310 makes the control output CTLOUT valid or invalid when the count value of the counter 305 becomes a specific value. As shown in FIG. 26C and FIG. 26G, in the present example, when the first address count value ACNTV21 becomes "6" and "12", the control output CTLOUT is made valid.

According to the present example, it is possible to output the control signal and the address validity signal simultaneously with the address generation, therefore there is the advantage that the memory and operation apparatus can be flexibly controlled by using these signals. Further, it is possible to control the timing of address generation by parameters, therefore it becomes possible to easily handle even the case where reading and writing to/from a plurality of memories have time dependencies.

As explained above, according to the present embodiments, when for example a case the operation switches from addition to subtraction only when a certain specific index condition is satisfied, since the operation element per se does not know the index of the array, that is, the address of the memory, the control for switching the operation is performed by the side generating the address, that is, the second generator, generating the control signal. By this, a series of processing is realized where a control signal is transferred to an operation element together with data read out from a memory by a second generator, the operation is carried out by that operation element, and the result thereof is written into for example a memory. In the operation element, the operation result is written into the holding circuit (register) under the control of the control signal and read out at a predetermined timing under the control of the control signal.

Summarizing the effects of the invention, according to the present invention, processing involving computations differing according to the input conditions can be continuously carried out. Further, there are the advantages that useless processing when operation can be interrupted in the middle when certain conditions are satisfied can be suppressed and an improvement of the transfer efficiency can be achieved. Further, it is not necessary to use a dual port memory, therefore there are the advantages that the apparatus costs can be suppressed and more efficient processing is possible, so it is possible to reduce the processing time and the power consumption.

It should be understood by those skilled in the art that various modifications, combinations, sub-combinations and alterations may occur depending on design requirements and other factors insofar as they are within the scope of the appended claims or the equivalents thereof.

What we claim is:

1. A physical operation apparatus comprising:
   i. a processor;
   ii. a memory associated with the processor and including a plurality of registers;
   iii. a first generator running in the memory and corresponding to at least one of the plurality of registers which is configured to generate first source data storable in respective registers;
   iv. a second generator running in the memory and corresponding to at least one of the plurality of registers which is configured to generate second source data storable in respective registers; and
   v. a spatially arranged operation element running in the memory which is configured to perform a predetermined data flow operation, wherein,
   vi. each generator temporarily stores the predetermined operation results in the respective registers,
   vii. the predetermined operation is performed independent of the respective registers of the first and second generators and in association with the first source data and the second source data by switching operations in response to a control signal,
   viii. the first generator or the second generator provides the control signal together with the generated first source data or the generated second source data to the operation element, and
   ix. the control signal controls reading and writing of data held by the plurality of registers.

2. A physical operation apparatus as set forth in claim 1, wherein
   i. the first generator is configured to generate a first address for reading the first source data and outputs the read first source data and the control signal to the operation element based on the generated first address, and ii. the second generator is configured to generate a second address for reading the second source data and outputs the read second source data and the control signal to the operation element based on the generated second address.

3. A physical operation apparatus as set forth in claim 2, further comprising a third generator running in the memory and corresponding to at least one of the plurality of registers which is configured to generate an address upon receiving an operation result from the operation element and which is configured to write the operation result into respective registers.

4. A physical operation apparatus as set forth in claim 1, wherein the operation element is configured to treat a plurality of data as a single group for accumulation when performing accumulation with data having a smaller word length than a bus width.

5. A physical operation apparatus comprising:
  i. a processor;
  ii. a memory associated with the processor and including a plurality of registers;
  iii. a first generator running in the memory and corresponding to at least one of the plurality of registers for generating which is configured to generate first source data storable in respective registers;
  iv. a second generator running in the memory and corresponding to at least one of the plurality of registers which is configured to generate second source data storable in respective registers and to provide a first control signal together with the second source data;
  v. a third generator running in the memory and corresponding to at least one of the plurality of registers which is configured to generate third source data storable in respective registers;
  vi. a first spatially arranged operation element running in the memory which is configured to perform a first predetermined data flow operation effective to generate; and
  vii. a second spatially arranged operation element running in the memory which is configured to perform a second predetermined data flow operation, wherein,
  viii. each generator temporarily holds operation results in the respective registers, the first and second predetermined operations are performed independent of the respective registers of the generators,
  ix. the first predetermined operation is performed in association with the first source data and the second source data,
  x. the second predetermined operation is performed in association with the third source data and the fourth source data by switching operations in response to a second control signal,
  xi. the third generator or the first operation element provides the second control signal together with the generated third source data or the generated fourth source data to the second operation element, and
  xii. the second control signal controls reading and writing of data held in the plurality of registers.

6. A physical operation apparatus as set forth in claim 5, wherein:
  the first generator is configured to generate a first address for reading the first source data and outputs the read first source data to the first operation element based on the generated first address;
  the second generator is configured to generate a second address for reading the second source data and outputs the read second source data and the first control signal to the first operation element based on the generated second address; and
  the third generator is configured to generate a third address for reading the third source data and outputs the read third source data to the second operation element based on the generated third address.

7. A physical operation apparatus as set forth in claim 6, further comprising a fourth generator running in the memory and corresponding to at least one of the plurality of registers which is configured to generate a fourth address storable in respective registers upon receiving an operation result of the second operation element, and for writing the operation result of the second operation element into respective registers.

8. A physical operation apparatus as set forth in claim 5, wherein the first or second operation element treats a plurality of data as a single group for accumulation when performing accumulation with data having a smaller word length than a bus width.

* * * * *